(12) United States Patent
Paolini, Jr. et al.

(10) Patent No.: US 10,324,354 B2
(45) Date of Patent: *Jun. 18, 2019

(54) ELECTRO-OPTIC DISPLAYS, AND MATERIALS FOR USE THEREIN

(71) Applicant: E INK CORPORATION, Billerica, MA (US)

(72) Inventors: Richard J. Paolini, Jr., Framingham, MA (US); Michael D. McCreary, Acton, MA (US); Charles Howie Honeyman, Toronto (CA); Bin Wu, Sharon, MA (US)

(73) Assignee: E Ink Corporation, Billerica, MA (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/402,273

(22) Filed: Jan. 10, 2017

(65) Prior Publication Data

US 2017/0131612 A1    May 11, 2017

Related U.S. Application Data

(60) Continuation of application No. 14/692,822, filed on Apr. 22, 2015, which is a continuation of application
(Continued)

(51) Int. Cl.
*G02F 1/167* (2019.01)
*C08J 7/16* (2006.01)
(Continued)

(52) U.S. Cl.
CPC ............... *G02F 1/167* (2013.01); *C08J 7/16* (2013.01); *C09J 175/04* (2013.01); *G02F 1/01* (2013.01);
(Continued)

(58) Field of Classification Search
CPC ............ G02F 1/167; G02F 2001/1678; G02F 1/13306; G02F 2001/1672;
(Continued)

(56) References Cited

U.S. PATENT DOCUMENTS 2,172,970 A    9/1939   Ford
3,668,106 A    6/1972   Ota
(Continued)

FOREIGN PATENT DOCUMENTS

EP    1099207    5/2001
EP    1145072    10/2001
(Continued)

OTHER PUBLICATIONS

Wood, D., "An Electrochromic Renaissance?" Information Display, 18(3), 24 (Mar. 2002) Mar. 1, 2002.
(Continued)

*Primary Examiner* — Evelyn A Lester
(74) *Attorney, Agent, or Firm* — Antranig Baronian

(57) ABSTRACT

A first electro-optic display comprises first and second substrates, and an adhesive layer and a layer of electro-optic material disposed between the first and second substrates, the adhesive layer comprising a mixture of a polymeric adhesive material and a hydroxyl containing polymer having a number average molecular weight not greater than about 5000. A second electro-optic display is similar to the first but has an adhesive layer comprising a thermally-activated cross-linking agent to reduce void growth when the display is subjected to temperature changes. A third electro-optic display, intended for writing with a stylus or similar instrument, is produced by forming a layer of an electro-optic material on an electrode; depositing a substantially solvent-
(Continued)

free polymerizable liquid material over the electro-optic material; and polymerizing the polymerizable liquid material.

12 Claims, 12 Drawing Sheets

Related U.S. Application Data

No. 12/871,155, filed on Aug. 30, 2010, now abandoned, which is a continuation-in-part of application No. PCT/US2009/036756, filed on Mar. 11, 2009, and a continuation-in-part of application No. 12/046,126, filed on Mar. 11, 2008, now Pat. No. 8,177,942, which is a continuation-in-part of application No. 11/613,259, filed on Dec. 20, 2006, now Pat. No. 7,349,148, which is a division of application No. 10/904,351, filed on Nov. 5, 2004, now Pat. No. 7,173,752.

(60) Provisional application No. 60/481,787, filed on Dec. 14, 2003, provisional application No. 60/481,605, filed on Nov. 6, 2003, provisional application No. 60/481,600, filed on Nov. 5, 2003.

(51) Int. Cl.

| | | |
|---|---|---|
| *G02F 1/01* | (2006.01) | |
| *G02F 1/1335* | (2006.01) | |
| *C09J 175/04* | (2006.01) | |
| *G06F 3/0354* | (2013.01) | |
| G02F 1/1675 | (2019.01) | |
| G02F 1/133 | (2006.01) | |
| G02F 1/061 | (2006.01) | |
| G02F 1/17 | (2019.01) | |
| G02F 1/1676 | (2019.01) | |
| G02F 1/1681 | (2019.01) | |
| G02F 1/1333 | (2006.01) | |

(52) U.S. Cl.
CPC .... *G02F 1/133514* (2013.01); *G06F 3/03545* (2013.01); *G02F 1/061* (2013.01); *G02F 1/13306* (2013.01); *G02F 1/1676* (2019.01); *G02F 1/1681* (2019.01); *G02F 1/172* (2013.01); *G02F 2001/133354* (2013.01); *G02F 2001/1678* (2013.01); *G02F 2202/022* (2013.01); *G02F 2202/28* (2013.01)

(58) Field of Classification Search
CPC ............. G02F 2001/1676; G02F 1/172; G02F 2202/28; G02F 1/133514; G02F 2202/022; G02F 1/061; G02F 2202/02; G02F 1/01; C02F 2001/133354; C08J 7/16; C09J 175/04; G06F 3/03545
USPC ..... 216/38; 204/157.15, 471, 475, 476, 478, 204/486, 487, 509; 156/272.2, 275.5; 264/1.36, 1.38, 1.7; 359/296; 345/107
See application file for complete search history.

(56) References Cited

U.S. PATENT DOCUMENTS

| | | |
|---|---|---|
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,383,060 A | 5/1983 | Dearlove |
| 4,418,346 A | 11/1983 | Batchelder |
| 4,448,493 A | 5/1984 | Matsudaira |
| 4,550,982 A | 11/1985 | Hirai |
| 5,173,342 A | 12/1992 | Sato |
| 5,621,043 A | 4/1997 | Croft |
| 5,719,247 A | 2/1998 | Delgado et al. |
| 5,745,094 A | 4/1998 | Gordon, II et al. |
| 5,760,761 A | 6/1998 | Sheridon |
| 5,777,782 A | 7/1998 | Sheridon |
| 5,784,190 A | 7/1998 | Worley |
| 5,808,783 A | 9/1998 | Crowley |
| 5,872,552 A | 2/1999 | Gordon, II |
| 5,891,366 A | 4/1999 | Gruenwald |
| 5,930,026 A | 7/1999 | Jacobson |
| 5,961,804 A | 10/1999 | Jacobson |
| 6,017,584 A | 1/2000 | Albert |
| 6,054,071 A | 4/2000 | Mikkelsen, Jr. |
| 6,055,091 A | 4/2000 | Sheridon |
| 6,067,185 A | 5/2000 | Albert |
| 6,097,531 A | 8/2000 | Sheridon |
| 6,118,426 A | 9/2000 | Albert |
| 6,120,588 A | 9/2000 | Jacobson |
| 6,120,839 A | 9/2000 | Comiskey |
| 6,124,851 A | 9/2000 | Jacobson |
| 6,128,124 A | 10/2000 | Silverman |
| 6,130,773 A | 10/2000 | Jacobson |
| 6,130,774 A | 10/2000 | Albert |
| 6,137,467 A | 10/2000 | Sheridon |
| 6,140,405 A | 10/2000 | Eckstein |
| 6,144,361 A | 11/2000 | Gordon, II |
| 6,147,791 A | 11/2000 | Sheridon |
| 6,172,798 B1 | 1/2001 | Albert |
| 6,177,921 B1 | 1/2001 | Comiskey |
| 6,184,331 B1 | 2/2001 | Chiang |
| 6,184,856 B1 | 2/2001 | Gordon, II |
| 6,225,971 B1 | 5/2001 | Gordon, II |
| 6,232,950 B1 | 5/2001 | Albert |
| 6,241,921 B1 | 6/2001 | Jacobson |
| 6,249,271 B1 | 6/2001 | Albert |
| 6,252,564 B1 | 6/2001 | Albert |
| 6,262,706 B1 | 7/2001 | Albert |
| 6,262,833 B1 | 7/2001 | Loxley |
| 6,271,823 B1 | 8/2001 | Gordon, II |
| 6,300,932 B1 | 10/2001 | Albert |
| 6,301,038 B1 | 10/2001 | Fitzmaurice |
| 6,312,304 B1 | 11/2001 | Duthaler |
| 6,312,971 B1 | 11/2001 | Amundson |
| 6,323,989 B1 | 11/2001 | Jacobson |
| 6,327,072 B1 | 12/2001 | Comiskey |
| 6,376,828 B1 | 4/2002 | Comiskey |
| 6,377,387 B1 | 4/2002 | Duthaler |
| 6,392,785 B1 | 5/2002 | Albert |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,445,489 B1 | 9/2002 | Jacobson |
| 6,451,408 B1 | 9/2002 | Haunschild et al. |
| 6,459,418 B1 | 10/2002 | Comiskey |
| 6,473,072 B1 | 10/2002 | Comiskey |
| 6,480,182 B2 | 11/2002 | Turner |
| 6,498,114 B1 | 12/2002 | Amundson |
| 6,504,524 B1 | 1/2003 | Gates |
| 6,506,438 B2 | 1/2003 | Duthaler |
| 6,512,354 B2 | 1/2003 | Jacobson |
| 6,515,649 B1 | 2/2003 | Albert |
| 6,518,949 B2 | 2/2003 | Drzaic |
| 6,521,489 B2 | 2/2003 | Duthaler et al. |
| 6,531,997 B1 | 3/2003 | Gates |
| 6,535,197 B1 | 3/2003 | Comiskey |
| 6,538,801 B2 | 3/2003 | Jacobson |
| 6,545,291 B1 | 4/2003 | Amundson |
| 6,552,131 B1 | 4/2003 | Higuchi et al. |
| 6,580,545 B2 | 6/2003 | Morrison |
| 6,639,578 B1 | 10/2003 | Comiskey |
| 6,652,075 B2 | 11/2003 | Jacobson |
| 6,656,319 B1 | 12/2003 | Boyd et al. |
| 6,657,772 B2 | 12/2003 | Loxley |
| 6,664,944 B1 | 12/2003 | Albert |
| D485,294 S | 1/2004 | Albert |
| 6,672,921 B1 | 1/2004 | Liang |

(56) References Cited

U.S. PATENT DOCUMENTS

| | | |
|---|---|---|
| 6,680,725 B1 | 1/2004 | Jacobson |
| 6,683,333 B2 | 1/2004 | Kazlas |
| 6,693,620 B1 | 2/2004 | Herb |
| 6,704,133 B2 | 3/2004 | Gates |
| 6,710,540 B1 | 3/2004 | Albert |
| 6,721,083 B2 | 4/2004 | Jacobson |
| 6,724,519 B1 | 4/2004 | Comiskey |
| 6,727,881 B1 | 4/2004 | Albert |
| 6,738,050 B2 | 5/2004 | Comiskey |
| 6,750,473 B2 | 6/2004 | Amundson |
| 6,753,999 B2 | 6/2004 | Zehner |
| 6,788,449 B2 | 9/2004 | Liang |
| 6,816,147 B2 | 11/2004 | Albert |
| 6,819,471 B2 | 11/2004 | Amundson |
| 6,822,782 B2 | 11/2004 | Honeyman |
| 6,825,068 B2 | 11/2004 | Denis |
| 6,825,829 B1 | 11/2004 | Albert |
| 6,825,970 B2 | 11/2004 | Goenaga |
| 6,831,769 B2 | 12/2004 | Holman |
| 6,839,158 B2 | 1/2005 | Albert |
| 6,842,167 B2 | 1/2005 | Albert |
| 6,842,279 B2 | 1/2005 | Amundson |
| 6,842,657 B1 | 1/2005 | Drzaic |
| 6,859,302 B2 | 2/2005 | Liang |
| 6,864,875 B2 | 3/2005 | Drzaic |
| 6,865,010 B2 | 3/2005 | Duthaler et al. |
| 6,866,760 B2 | 3/2005 | Paolini, Jr. |
| 6,870,657 B1 | 3/2005 | Fitzmaurice |
| 6,870,661 B2 | 3/2005 | Pullen et al. |
| 6,881,591 B2 | 4/2005 | Gotoh et al. |
| 6,900,851 B2 | 5/2005 | Morrison |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson |
| 7,002,728 B2 | 2/2006 | Pullen et al. |
| 7,012,600 B2 | 3/2006 | Zehner |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates |
| 7,038,655 B2 | 5/2006 | Herb |
| 7,038,670 B2 | 5/2006 | Liang |
| 7,061,663 B2 | 6/2006 | Cao et al. |
| 7,071,913 B2 | 7/2006 | Albert |
| 7,075,502 B1 | 7/2006 | Drzaic |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson |
| 7,148,128 B2 | 12/2006 | Jacobson |
| 7,166,182 B2 | 1/2007 | Pereira |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner |
| 7,312,916 B2 | 12/2007 | Pullen |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert |
| 7,365,394 B2 | 4/2008 | Denis et al. |
| 7,365,733 B2 | 4/2008 | Duthaler |
| 7,369,299 B2 | 5/2008 | Sakurai et al. |
| 7,375,875 B2 | 5/2008 | Whitesides |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson |
| 7,442,587 B2 | 10/2008 | Amundson et al. |
| 7,443,571 B2 | 10/2008 | Lecain et al. |
| 7,453,445 B2 | 11/2008 | Amundson |
| 7,477,444 B2 | 1/2009 | Cao et al. |
| 7,492,339 B2 | 2/2009 | Amundson |
| 7,492,497 B2 | 2/2009 | Paolini, Jr. |
| 7,513,813 B2 | 4/2009 | Paolini, Jr. et al. |
| 7,525,719 B2 | 4/2009 | Yakushiji |
| 7,528,822 B2 | 5/2009 | Amundson |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel |
| 7,554,712 B2 | 6/2009 | Patry et al. |
| 7,560,004 B2 | 7/2009 | Pereira |
| 7,561,324 B2 | 7/2009 | Duthaler et al. |
| 7,583,251 B2 | 9/2009 | Arango |
| 7,583,427 B2 | 9/2009 | Danner |
| 7,598,173 B2 | 10/2009 | Ritenour |
| 7,602,374 B2 | 10/2009 | Zehner et al. |
| 7,605,799 B2 | 10/2009 | Amundson et al. |
| 7,612,760 B2 | 11/2009 | Kawai |
| 7,636,191 B2 | 12/2009 | Duthaler |
| 7,646,530 B2 | 1/2010 | Takagi et al. |
| 7,649,666 B2 | 1/2010 | Isobe et al. |
| 7,649,674 B2 | 1/2010 | Danner |
| 7,667,684 B2 | 2/2010 | Jacobson et al. |
| 7,667,886 B2 | 2/2010 | Danner |
| 7,672,040 B2 | 3/2010 | Sohn |
| 7,679,599 B2 | 3/2010 | Kawai |
| 7,679,814 B2 | 3/2010 | Paolini, Jr. et al. |
| 7,688,297 B2 | 3/2010 | Zehner et al. |
| 7,705,823 B2 | 4/2010 | Nihei |
| 7,705,824 B2 | 4/2010 | Baucom et al. |
| 7,728,811 B2 | 6/2010 | Albert et al. |
| 7,729,039 B2 | 6/2010 | LeCain et al. |
| 7,733,311 B2 | 6/2010 | Amundson |
| 7,733,335 B2 | 6/2010 | Zehner et al. |
| 7,733,554 B2 | 6/2010 | Danner et al. |
| 7,787,169 B2 | 8/2010 | Abramson et al. |
| 7,826,129 B2 | 11/2010 | Wu |
| 7,839,564 B2 | 11/2010 | Whitesides et al. |
| 7,843,621 B2 | 11/2010 | Danner et al. |
| 7,859,637 B2 | 12/2010 | Amundson et al. |
| 7,893,435 B2 | 2/2011 | Kazlas et al. |
| 7,903,319 B2 | 3/2011 | Honeyman |
| 7,910,175 B2 | 3/2011 | Webber |
| 7,952,557 B2 | 5/2011 | Amundson |
| 7,952,790 B2 | 5/2011 | Honeyman |
| 7,956,841 B2 | 6/2011 | Albert |

(56) References Cited

U.S. PATENT DOCUMENTS

| | | |
|---|---|---|
| 7,999,787 B2 | 8/2011 | Amundson |
| 8,009,348 B2 | 8/2011 | Zehner |
| 8,018,640 B2 | 9/2011 | Whitesides |
| 8,035,886 B2 | 10/2011 | Jacobson |
| 8,064,962 B2 | 11/2011 | Wilcox et al. |
| 8,089,453 B2 | 1/2012 | Comiskey |
| 8,115,729 B2 | 2/2012 | Danner |
| 8,125,501 B2 | 2/2012 | Amundson |
| 8,129,655 B2 | 3/2012 | Jacobson et al. |
| 8,139,050 B2 | 3/2012 | Jacobson et al. |
| 8,174,490 B2 | 5/2012 | Whitesides |
| 8,177,942 B2 | 5/2012 | Paolini, Jr. |
| 8,289,250 B2 | 10/2012 | Zehner et al. |
| 8,300,006 B2 | 10/2012 | Zhou |
| 8,384,658 B2 | 2/2013 | Albert |
| 8,466,852 B2 | 6/2013 | Drzaic |
| 8,558,783 B2 | 10/2013 | Wilcox |
| 8,610,988 B2 | 12/2013 | Zehner et al. |
| 8,928,562 B2 | 1/2015 | Gates et al. |
| 8,969,886 B2 | 3/2015 | Amundson |
| 9,152,004 B2 | 10/2015 | Paolini, Jr. |
| 2002/0027635 A1 | 3/2002 | Sakamaki |
| 2002/0060321 A1 | 5/2002 | Kazlas |
| 2002/0090980 A1 | 7/2002 | Wilcox et al. |
| 2002/0113770 A1 | 8/2002 | Jacobson et al. |
| 2003/0058521 A1 | 3/2003 | Kawai |
| 2003/0102858 A1 | 6/2003 | Jacobson et al. |
| 2004/0105036 A1 | 6/2004 | Danner et al. |
| 2004/0119681 A1 | 6/2004 | Albert et al. |
| 2004/0157977 A1 | 8/2004 | Kotsubo et al. |
| 2005/0012980 A1 | 1/2005 | Wilcox et al. |
| 2005/0018273 A1 | 1/2005 | Honeyman et al. |
| 2005/0122306 A1 | 6/2005 | Wilcox et al. |
| 2005/0122563 A1 | 6/2005 | Honeyman et al. |
| 2005/0156340 A1 | 7/2005 | Valianatos et al. |
| 2005/0253777 A1 | 11/2005 | Zehner et al. |
| 2005/0259068 A1 | 11/2005 | Nihei et al. |
| 2006/0020062 A1 | 1/2006 | Bloom |
| 2006/0087479 A1 | 4/2006 | Sakurai et al. |
| 2006/0087489 A1 | 4/2006 | Sakurai et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2007/0052757 A1 | 3/2007 | Jacobson |
| 2007/0091417 A1 | 4/2007 | Cao et al. |
| 2007/0091418 A1 | 4/2007 | Danner et al. |
| 2007/0103427 A1 | 5/2007 | Zhou |
| 2007/0126951 A1 | 6/2007 | Vogels |
| 2007/0285385 A1 | 12/2007 | Albert |
| 2008/0020007 A1 | 1/2008 | Zang |
| 2008/0024429 A1 | 1/2008 | Zehner |
| 2008/0024482 A1 | 1/2008 | Gates |
| 2008/0043318 A1 | 2/2008 | Whitesides |
| 2008/0048970 A1 | 2/2008 | Drzaic |
| 2008/0130092 A1 | 6/2008 | Whitesides |
| 2008/0136774 A1 | 6/2008 | Harris |
| 2008/0273132 A1 | 11/2008 | Hsu |
| 2015/0338717 A1 | 11/2015 | Paolini, Jr. |

FOREIGN PATENT DOCUMENTS

| | | |
|---|---|---|
| EP | 1462847 A1 | 9/2004 |
| JP | H10269853 A | 10/1998 |
| JP | H11195325 A | 7/1999 |
| JP | 2001164216 A | 6/2001 |
| JP | 2004098322 | 4/2004 |
| WO | 2000036560 | 6/2000 |
| WO | 2000038000 | 6/2000 |
| WO | 2000067110 | 11/2000 |
| WO | 2001007961 | 2/2001 |
| WO | 2001017041 A1 | 3/2001 |
| WO | 2004079442 | 9/2004 |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 737-740 Oct. 24, 1991.

Bach, U., et al., "Nanomaterials-Based Electrochromics for Paper-Quality Displays", Adv. Mater, 14(11), 845 (2002) Jun. 5, 2002.

Hayes, R.A., et al., "Video-Speed Electronic Paper Based on Electrowetting", Nature, vol. 425, Sep. 25, pp. 383-385 (2003) Sep. 25, 2003.

Yamaguchi, Y., et al., "Toner display using insulative particles charged triboelectrically", Asia Display/IDW '01, p. 1729, Paper AMD4-4 (2001) Jan. 1, 2001.

Kitamura, T., et al., "Electrical toner movement for electronic paper-like display", Asia Display/IDW '01, p. 1517, Paper HCS1-1 (2001) Dec. 31, 2001.

Chen, Y., et al., "A Conformable Electronic Ink Display using a Foil-Based a-Si TFT Array", SID 01 Digest, 157 (Jun. 2001) Jun. 30, 2001.

Comiskey, B., et al., "An electrophoretic ink for all-printed reflective electronic displays", Nature, 394, 253 (1998) Dec. 31, 1998.

Comiskey, B., et al., "Electrophoretic Ink: A Printable Display Material", SID 97 Digest (1997), p. 75 Dec. 31, 1997.

Drzaic, P., et al., "A Printed and Rollable Bistable Electronic Display", SID 98 Digest (1998), p. 1131 Dec. 31, 1998.

Duthaler, G., et al., "Active-Matrix Color Displays Using Electrophoretic Ink and Color Filters", SID 02 Digest, 1374 (2002) Dec. 31, 2002.

Jacobson, J., et al., "The last book", IBM Systems J., 36, 457 (1997) Dec. 31, 1997.

Jo, G-R, et al., "Toner Display Based on Particle Movements", Chem. Mater, 14, 664 (2002) Dec. 31, 2002.

Kazlas, P., et al., "12.1" SVGA Microencapsulated Electrophoretic Active Matrix Display for Information Applicances, SID 01 Digest, 152 (Jun. 2001) Jun. 30, 2001.

Pitt, M.G., et al., "Power Consumption of Microencapsulated Electrophoretic Displays for Smart Handheld Applications", SID 02 Digest, 1378 (2002) Dec. 31, 2002.

Webber, R., "Image Stability in Active-Matrix Microencapsulated Electrophoretic Displays", SID 02 Digest, 126 (2002) Dec. 31, 2002.

Zehner, R. et al., "Drive Waveforms for Active Matrix Electrophoretic Displays", SID 03 Digest, 842 (2003) Dec. 31, 2003.

Amundson, K., et al., "12.3: Flexible, Active-Matrix Display Constructed Using a Microencapsulated Electrophoretic Material and an Organic-Semiconductor-Based Backplane", SID 01 Digest, 160 (Jun. 2001) Jun. 30, 2001.

Au, J. et al., "Ultra-Thin 3.1-in. Active-Matrix Electronic Ink Display for Mobile Devices", IDW'02, 223 (2002) Dec. 31, 2002.

Bouchard, A. et al., "High-Resolution Microencapsulated Electrophoretic Display on Silicon", SID 04 Digest, 651 (2004) Dec. 31, 2004.

Caillot, E. et al. "Active Matrix Electrophoretic Information Display for High Performance Mobile Devices", IDMC Proceedings (2003) Dec. 31, 2003.

Danner, G.M. et al., "Reliability Performance for Microencapsulated Electrophoretic Displays with Simulated Active Matrix Drive", SID 03 Digest, 573 (2003) Dec. 31, 2003.

Henzen, A. et al., "An Electronic Ink Low Latency Drawing Tablet", SID 04 Digest, 1070 (2004) Dec. 31, 2004.

Henzen, A. et al., "Development of Active Matrix Electronic Ink Displays for Handheld Devices", SID 03 Digest, 176, (2003) Dec. 31, 2003.

Henzen, A. et al., "Development of Active Matrix Electronic Ink Displays for Smart Handheld Applications", IDW'02, 227 (2002) Dec. 31, 2002.

Kazlas, P. et al., "Card-size Active-matrix Electronic Ink Display", Eurodisplay 2002, 259 (2002) Dec. 31, 2002.

Whitesides, T. et al., "Towards Video-rate Microencapsulated Dual-Particle Electrophoretic Displays", SID 04 Digest, 133 (2004) Dec. 31, 2004.

Amundson, K., "Electrophoretic Imaging Films for Electronic Paper Displays" in Crawford, G. ed. Flexible Flat Panel Displays, John Wiley & Sons, Ltd., Hoboken, NJ (2005) Dec. 31, 2005.

(56) References Cited

OTHER PUBLICATIONS

Gates, H. et al. "A5 Sized Electronic Paper Display for Document Viewing", SID 05 Digest (2005) Dec. 31, 2005.
Johnson, M. et al., "High Quality Images on Electronic Paper Displays", SID 05 Digest, 1666 (2005) Dec. 31, 2005.
Young, N.D. et al, "AMLCDs and Electronics on Polymer Substrates", Euro Display 1996, pp. 555-558 Dec. 31, 1996.
Korean Intellectual Property Office, PCT/US2009/036756, International Search Report and Written Opinion, dated Mar. 11, 2009.

ELECTRO-OPTIC DISPLAYS, AND MATERIALS FOR USE THEREIN

REFERENCE TO RELATED APPLICATIONS

This application is a continuation of application Ser. No. 14/692,822, filed on Apr. 22, 2015, which itself is a continuation of application Ser. No. 12/871,155 filed on Aug. 30, 2010, which itself is a continuation-in-part of copending International Application No. PCT/US2009/036756, filed Mar. 11, 2009 (Publication No. WO 2009/151675) and of copending application Ser. No. 12/046,126, filed Mar. 11, 2008 (Publication No. 2008/0218839, now U.S. Pat. No. 8,177,942, issued on May 15, 2012), which is itself a continuation-in-part of application Ser. No. 11/613,259, filed Dec. 20, 2006 (Publication No. 2007/0097489, now U.S. Pat. No. 7,349,148, issued Mar. 25, 2008), which is itself a divisional of application Ser. No. 10/904,351, filed Nov. 5, 2004 (now U.S. Pat. No. 7,173,752, issued Feb. 6, 2007), which claims benefit of Application Ser. No. 60/481,600, filed Nov. 5, 2003, of Application Ser. No. 60/481,605, filed Nov. 6, 2003, and of Application Ser. No. 60/481,787, filed Dec. 14, 2003.

This application is related to:
(a) application Ser. No. 10/064,389, filed Jul. 2, 2002 (now U.S. Pat. No. 6,831,769);
(b) application Ser. No. 10/898,027, filed Jul. 23, 2004 (Publication No. 2005/0122563, now abandoned);
(c) application Ser. No. 10/810,761, filed Mar. 26, 2004 (now U.S. Pat. No. 7,012,735); and
(d) application Ser. No. 10/904,063, filed Oct. 21, 2004 (now U.S. Pat. No. 7,110,164).

The entire contents of the aforementioned applications are herein incorporated by reference. The entire contents of all United States patents and published and copending applications mentioned below are also herein incorporated by reference.

BACKGROUND OF INVENTION

The present invention relates to electro-optic displays and to materials for use therein. More specifically, this invention relates to binders and adhesive compositions having controlled volume resistivity, and to electro-optic displays incorporating such materials. This invention also relates to the prevention of void growth in electro-optic displays. The present invention is especially, though not exclusively, intended for use in displays containing encapsulated electrophoretic media. Certain materials provided by the present invention may be useful in applications other than electro-optic displays.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

In the displays of the present invention, the electro-optic medium will typically be a solid (such displays may hereinafter for convenience be referred to as "solid electro-optic displays"), in the sense that the electro-optic medium has solid external surfaces, although the medium may, and often does, have internal liquid- or gas-filled spaces. Thus, the term "solid electro-optic displays" includes encapsulated electrophoretic displays, encapsulated liquid crystal displays, and other types of displays discussed below.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500, 971; 1,501,194; 1,536,271; 1,542,067; 1,577,702; 1,577, 703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961, 804; 6,017,584; 6,067,185; 6,118,426; 6,120,588; 6,120, 839; 6,124,851; 6,130,773; 6,130,774; 6,172,798; 6,177, 921; 6,232,950; 6,249,271; 6,252,564; 6,262,706; 6,262, 833; 6,300,932; 6,312,304; 6,312,971; 6,323,989; 6,327, 072; 6,376,828; 6,377,387; 6,392,785; 6,392,786; 6,413, 790; 6,422,687; 6,445,374; 6,445,489; 6,459,418; 6,473, 072; 6,480,182; 6,498,114; 6,504,524; 6,506,438; 6,512, 354; 6,515,649; 6,518,949; 6,521,489; 6,531,997; 6,535, 197; 6,538,801; 6,545,291; 6,580,545; 6,639,578; 6,652, 075; 6,657,772; 6,664,944; 6,680,725; 6,683,333; 6,704, 133; 6,710,540; 6,721,083; 6,724,519; 6,727,881; 6,738, 050; 6,750,473; 6,753,999; 6,816,147; 6,819,471; 6,822, 782; 6,825,068; 6,825,829; 6,825,970; 6,831,769; 6,839, 158; 6,842,167; 6,842,279; 6,842,657; 6,864,875; 6,865, 010; 6,866,760; 6,870,661; 6,900,851; 6,922,276; 6,950, 200; 6,958,848; 6,967,640; 6,982,178; 6,987,603; 6,995, 550; 7,002,728; 7,012,600; 7,012,735; 7,023,420; 7,030, 412; 7,030,854; 7,034,783; 7,038,655; 7,061,663; 7,071, 913; 7,075,502; 7,075,703; 7,079,305; 7,106,296; 7,109, 968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,790; 7,236,792; 7,242,513; 7,247,379; 7,256,766; 7,259,744; 7,280,094; 7,304,634; 7,304,787; 7,312,784; 7,312,794; and 7,312,916; and U.S. patent applications Publication Nos. 2002/0060321; 2002/0090980; 2003/ 0102858; 2003/0151702; 2003/0222315; 2004/0105036; 2004/0112750; 2004/0119681; 2004/0155857; 2004/ 0180476; 2004/0190114; 2004/0196215; 2004/0226820; 2004/0257635; 2004/0263947; 2005/0000813; 2005/ 0007336; 2005/0012980; 2005/0018273; 2005/0024353; 2005/0062714; 2005/0067656; 2005/0099672; 2005/ 0122284; 2005/0122306; 2005/0122563; 2005/0134554; 2005/0151709; 2005/0152018; 2005/0156340; 2005/ 0179642; 2005/0190137; 2005/0212747; 2005/0213191; 2005/0253777; 2005/0280626; 2006/0007527; 2006/ 0038772; 2006/0139308; 2006/0139310; 2006/0139311; 2006/0176267; 2006/0181492; 2006/0181504; 2006/ 0194619; 2006/0197737; 2006/0197738; 2006/0202949; 2006/0223282; 2006/0232531; 2006/0245038; 2006/ 0262060; 2006/0279527; 2006/0291034; 2007/0035532; 2007/0035808; 2007/0052757; 2007/0057908; 2007/ 0069247; 2007/0085818; 2007/0091417; 2007/0091418; 2007/0097489; 2007/0109219; 2007/0128352; 2007/ 0146310; 2007/0152956; 2007/0153361; 2007/0200795; 2007/0200874; 2007/0201124; 2007/0207560; 2007/ 0211002; 2007/0211331; 2007/0223079; 2007/0247697; 2007/0285385; and 2007/0286975; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See US Patent Publication No. 2004/0226820); and other similar techniques.) Thus, the resulting display can be flexible. Further, because the display medium can be printed (using a variety of methods), the display itself can be made inexpensively.

In addition to the layer of electro-optic material, an electro-optic display normally comprises at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, especially in the case of a display using an encapsulated electrophoretic medium. The lamination adhesive should have sufficient adhesive strength to bind the electro-optic layer to the layer (typically an electrode layer) to which it is to be laminated, and in the case of an encapsulated electrophoretic medium, the adhesive should also have sufficient adhesive strength to mechanically hold the capsules together. If the electro-optic display is to be of a flexible type (and one of the important advantages of rotating bichromal member and encapsulated electrophoretic displays is that they can be made flexible), the adhesive should have sufficient flexibility not to introduce defects into the display when the display is flexed. The lamination adhesive should have adequate flow properties at the lamination temperature to ensure high quality lamination, and in this regard, the demands of laminating encapsulated electrophoretic and some other types of electro-optic media are unusually difficult; the lamination has be conducted at a temperature of not more than about 130° C. since the medium cannot be exposed to substantially higher temperatures without damage, but the flow of the adhesive must cope with the relatively uneven surface of the capsule-containing layer, the surface of which is rendered irregular by the underlying capsules. The lamination temperature should indeed be kept as low as possible, and room temperature lamination would be ideal, but no commercial adhesive has been found which permits such room temperature lamination. The lamination adhesive should be chemically compatible with all the other materials in the display.

As discussed in detail in the aforementioned U.S. Pat. No. 6,831,769, a lamination adhesive used in an electro-optic display should meet certain electrical criteria, and this introduces considerable problems in the selection of the lamination adhesive. Commercial manufacturers of lamination adhesives naturally devote considerable effort to ensuring that properties, such as strength of adhesion and lamination temperatures, of such adhesives are adjusted so that the adhesives perform well in their major applications, which typically involve laminating polymeric and similar films. However, in such applications, the electrical properties of the lamination adhesive are not relevant, and consequently the commercial manufacturers pay no heed to such electrical properties. Indeed, substantial variations (of up to several fold) in certain electrical properties may exist between different batches of the same commercial lamination adhesive, presumably because the manufacturer was attempting to optimize non-electrical properties of the lamination adhesive (for example, resistance to bacterial growth) and was not at all concerned about resulting changes in electrical properties.

However, in electro-optic displays, in which the lamination adhesive is normally located between the electrodes, which apply the electric field needed to change the electrical state of the electro-optic medium, the electrical properties of the adhesive may become crucial. As will be apparent to electrical engineers, the volume resistivity of the lamination adhesive becomes important, since the voltage drop across the electro-optic medium is essentially equal to the voltage drop across the electrodes, minus the voltage drop across the lamination adhesive. If the resistivity of the adhesive layer is too high, a substantial voltage drop will occur within the adhesive layer, requiring an increase in voltage across the electrodes. Increasing the voltage across the electrodes in this manner is undesirable, since it increases the power consumption of the display, and may require the use of more complex and expensive control circuitry to handle the increased voltage involved. On the other hand, if the adhesive layer, which extends continuously across the display, is in contact with a matrix of electrodes, as in an active matrix display, the volume resistivity of the adhesive layer should not be too low, or lateral conduction of electric current through the continuous adhesive layer may cause undesirable cross-talk between adjacent electrodes. Also, since the volume resistivity of most materials decreases rapidly with increasing temperature, if the volume resistivity of the adhesive is too low, the performance of the display at temperatures substantially above room temperature is adversely affected. For these reasons, there is an optimum range of lamination adhesive resistivity values for use with any given electro-optic medium, this range varying with the resistivity of the electro-optic medium. The volume resistivities of encapsulated electrophoretic media are typically around $10^{10}$ ohm cm, and the resistivities of other electro-optic media are usually of the same order of magnitude. Accordingly, the volume resistivity of the lamination adhesive should normally be around $10^8$ to $10^{12}$ ohm cm, or about $10^9$ to $10^{11}$ ohm cm, at the operating temperature of the display, typically around 20° C. The lamination adhesive should also have a variation of volume resistivity with temperature which is similar to that of the electro-optic medium itself.

The number of commercial materials which can meet most of the previously discussed, rather disparate requirements for a lamination adhesive for use in an electro-optic display is small, and in practice a small number of water-dispersed urethane emulsions have been used for this purpose. A similar group of materials have been used as the binder for an encapsulated electrophoretic medium.

However, the use of such polyester-based urethane emulsions as lamination adhesives is still a not entirely satisfactory compromise between the desired mechanical and electrical properties. Lamination adhesives such as acrylic polymers and pressure sensitive adhesives are available with much better mechanical properties, but the electrical properties of these materials are unsuitable for use in electro-optic displays. Moreover, hitherto there has been no satisfactory way of varying the electrical properties of the urethane emulsions to "fine tune" them to match the electrical properties of a specific electro-optic medium. Accordingly, it would be highly advantageous if some way could be found to "decouple" the mechanical and electrical properties of a lamination adhesive so that each set of properties could be optimized separately, i.e., in practice, one could choose an adhesive with highly desirable mechanical properties and then optimize its electrical properties for use with a specific electro-optic medium. One aspect of the present invention provides a way of varying the electrical properties of an adhesive without substantially affecting its mechanical properties. The present invention may also be used to vary the electrical properties of a binder without substantially affecting its mechanical properties.

Furthermore, in considering the choice of a lamination adhesive for use in an electro-optic display, attention must be paid to the process by which the display is to be assembled. Most prior art methods for final lamination of electrophoretic displays are essentially batch methods in which the electro-optic medium, the lamination adhesive and the backplane are only brought together immediately prior to final assembly, and it is desirable to provide methods better adapted for mass production. However, the aforementioned U.S. Pat. No. 6,982,178 describes a method of assembling a solid electro-optic display (including a particle-based electrophoretic display), which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 μm), preferably about 2 to about 10 mil (51 to 254 μm). The electrically-conductive layer is conveniently a thin metal layer of, for example, aluminum or ITO, or may be a conductive polymer. Polyethylene terephthalate (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, electro-optic medium layer and electrically-conductive layer to the backplane. This process is well-adapted to mass production since the front plane laminate may be mass produced, typically using roll-to-roll coating techniques, and then cut into pieces of any size needed for use with specific backplanes.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate previously described. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display.

In view of the advantages of the assembly method using a front plane laminate described in the aforementioned U.S. Pat. No. 6,982,178, it is desirable that a lamination adhesive be capable of being incorporated into such a front plane laminate. It is also desirable that a lamination adhesive be capable of being incorporated into a double release film as previously described.

The aforementioned U.S. Pat. No. 6,831,769 also describes certain polyurethane dispersions especially formulated for use in electro-optic displays.

The aforementioned U.S. Pat. No. 7,012,735 describes an electro-optic display comprising first and second substrates, and an adhesive layer and a layer of electro-optic material disposed between the first and second substrates, the adhesive layer comprising a mixture of a polymeric adhesive material and a salt or other polyelectrolyte. The salt may be for example a tetraalkylammonium salt such as tetrabutylammonium chloride, or potassium acetate. (It has also been found that tetrabutylammonium hexafluorophosphate may advantageously be substituted for the chloride on a mole-for-mole basis.) The polyelectrolyte may be a polymeric material, for example the sodium salt of polyacrylic acid. The salt or polyelectrolyte serves to vary the volume resistivity of the adhesive material but typically does not substantially affect the mechanical properties of this material.

This application also describes an electrophoretic medium comprising a plurality of capsules, each of the capsules comprising a capsule wall, a suspending fluid encapsulated within the capsule wall and a plurality of electrically charged particles suspended in the suspending fluid and capable of moving therethrough on application of an electric field to the medium, the medium further comprising a binder surrounding the capsules, the binder comprising a mixture of a polymeric adhesive material and a salt or other polyelectrolyte. The salt or polyelectrolyte may be any of those previously described.

The displays and media described in the aforementioned U.S. Pat. No. 7,012,735 give good results. However, in at least some cases, there are concerns that addition of ionic species to adhesives and/or binders used in electro-optic displays might possibly cause corrosion problems in certain materials used in electro-optic displays, in particular the backplanes thereof which are typically in direct contact with the lamination adhesive. In one aspect, this invention relates to alternative additives which can be used to vary the volume resistivity and enhance the low temperature performance of electro-optic displays. In another aspect, this invention relates to modification of polyurethane adhesives to render them more suitable for use in electro-optic displays.

As already mentioned, the lamination processes used to manufacture electro-optic displays impose stringent requirements upon both the mechanical and electrical properties of the lamination adhesive. In the final display, the lamination adhesive is located between the electrodes which apply the electric field needed to change the electrical state of the electro-optic medium, so that the electrical properties of the adhesive become crucial. As will be apparent to electrical engineers, the volume resistivity of the lamination adhesive becomes important, since the voltage drop across the electro-optic medium is essentially equal to the voltage drop across the electrodes, minus the voltage drop across the lamination adhesive. If the resistivity of the adhesive layer is too high, a substantial voltage drop will occur within the adhesive layer, requiring an increase in voltage across the electrodes. Increasing the voltage across the electrodes in this manner is undesirable, since it increases the power consumption of the display, and may require the use of more complex and expensive control circuitry to handle the increased voltage involved.

However, there are other constraints which the lamination adhesive must satisfy. Void growth may be encountered in various types of solid electro-optic displays, and to ensure a high quality display, it is essential that the final display be free from voids, since such voids produce visible defects in images written on the display, as illustrated below. To ensure that the final display is free from voids, it is essential that both the lamination to form the front plane laminate (when effected) and the final lamination to the backplane be carried out without the formation of voids. It is also necessary that the final display be able to withstand substantial temperature changes (such as may occur, for example, when a portable computer or personal digital assistant is removed from an air-conditioned car to outdoor sun on a hot day) without inducing or aggravating the formation of voids, since it has been found that some displays, which initially appear essentially free from voids, can develop objectionable voids when exposed to such temperature changes. This phenomenon may be termed "void re-growth".

The present inventors and their coworkers have determined that when the preferred type of display described in the aforementioned U.S. Pat. No. 6,982,178, and comprising an encapsulated electrophoretic medium laminated to a thin film transistor (TFT) backplane by means of a polyurethane lamination adhesive, is exposed to high temperatures (say 70-90° C.) for an extended period (in excess of about 10 hours), voids begin to appear at the interface between the lamination adhesive and the backplane, and grow to produce air gaps between the lamination adhesive and the backplane. These air gaps result in visible defects in an image formed on the electrophoretic medium, since the electrophoretic medium will not switch between its optical states in the areas affected by the air gaps. Eventually, the voids and associated non-switching areas can grow to large sizes, typically about 1 to 5 mm in diameter.

Accordingly, another aspect of the present invention relates to an electro-optic display comprising an adhesive modified to reduce or eliminate the formation of voids when the display is exposed to elevated temperatures, even for a prolonged period.

Another aspect of the present invention relates to so-called "stylus-based displays". As discussed above, most electro-optic displays are constructed with fixed electrodes on both sides of the electro-optic medium. However, it is known (see, for example, the aforementioned U.S. Pat. No. 6,473,072) that electro-optic displays can be constructed with a fixed electrode on only one side of the electro-optic medium, typically on the side opposite the viewing surface of the display. The other electrode needed to provide an electric field across the electro-optic medium has the form of a stylus, printhead or similar movable device which can be moved, either manually or mechanically, relative to the electro-optic medium. (The term "stylus-based displays" is used herein in a broad sense to cover all displays having such a movable electrode regardless of the exact nature of the movable electrode, and the term "stylus" is used to refer to all such movable electrodes.) Such stylus-based displays are useful, inter alia, for capturing hand-written material, including signatures, since a user can manipulate a movable electrode in a manner similar to a pen and "write" on the viewing surface of the display.

One problem in producing stylus-based displays is providing a suitable layer between the electro-optic medium and the stylus. Many electro-optic media are susceptible to mechanical damage, and given the heavy-handed manner in which some users tend to handle a stylus when writing on an electro-optic display, it is necessary to provide, between the electro-optic medium and the stylus, a protective layer sufficiently thick and robust to protect the electro-optic medium from mechanical damage. However, since such a protective layer lies between the electrodes of the display, there is a voltage drop across the protective layer which, for any given operating voltage applied between the electrodes, reduces the voltage across the electro-optic medium itself, and hence reduces the electro-optic performance of this medium. Although it might appear that the voltage drop across the protective layer could be minimized by using a highly conductive protective layer, the resistance of the protective layer needs to be large enough to prevent lateral flow of current (i.e., flow of current in the plane of the protective layer) through the protective layer, since such lateral flow of current causes changes in the optical state of the electro-optic medium over areas substantially wider than the width of the stylus, and thus in effect "smears" the line produced by moving the stylus over the protective layer.

The voltage drop across the protective layer can require a substantial increase in the operating voltage of the display to provide satisfactory electro-optic performance. For example, encapsulated electrophoretic media sold commercially by E Ink Corporation operate at 15 V, when used in displays with two set of fixed electrodes such that only the electro-optic medium and a (relatively thin) lamination adhesive layer is present between the electrodes. To use such electrophoretic media in stylus-based displays, it has hitherto been deemed necessary to use polymer sheets such as Pomalux SD-A (a static-dissipative acetal copolymer manufactured by Westlake Plastics Co., P.O. Box 127, Lenni Pa. 19052-0127) in thicknesses of 5-10 mil (127-254 µm). These polymer sheets are stiff, and increase the required operating voltage of the display to 100-200 V. Such high operating voltages are disadvantageous in that they are often perceived by users as unsafe (in fact, the very low currents required by electrophoretic displays allow such voltages to be used with complete safety). More importantly, one major application for stylus-based displays is electronic notebooks, which need to be highly portable and battery powered. Producing an operating voltage of 100-200 V from batteries requires complex and relatively expensive power supply circuitry, and the high voltages uses so much power that battery life is undesirably short. Also, the thickness of the protective layer reduces the maximum resolution of the display, because there is inevitably some lateral flow of current within the protective layer, so that lines written by a stylus are inevitably widened by some fraction of the thickness of the protective layer.

Accordingly, there is a need for a protective sheet for stylus-based electro-optic displays which can provide adequate protection to the electro-optic medium while reducing the operating voltage needed, and the present invention seeks to provide such a protective layer.

SUMMARY OF THE INVENTION

In one aspect, this invention provides an electro-optic display comprising first and second substrates, and an adhesive layer and a layer of electro-optic material disposed between the first and second substrates, the adhesive layer comprising a mixture of a polymeric adhesive material and a hydroxyl containing polymer having a number average molecular weight not greater than about 5000.

This aspect of the present invention may hereinafter for convenience be referred to as the "low molecular weight polymer" display. In such a display, the hydroxyl containing polymer may be a poly(ethylene glycol), typically one having a number average molecular weight not greater than about 2000. The poly(ethylene glycol) may be present at a concentration of from about $10^{-6}$ to about $10^{-5}$ moles per gram of polymeric adhesive material.

In another aspect, this invention provides an electrophoretic medium comprising a plurality of droplets, each of the droplets comprising a suspending fluid and a plurality of electrically charged particles suspended in the suspending fluid and capable of moving therethrough on application of an electric field to the medium, the medium further comprising a binder surrounding the droplets, the binder comprising a mixture of a polymeric adhesive material and a hydroxyl containing polymer having a number average molecular weight not greater than about 5000.

This aspect of the present invention may hereinafter for convenience be referred to as the "low molecular weight polymer" medium. In such a medium, the hydroxyl containing polymer may be a poly(ethylene glycol), typically one having a number average molecular weight not greater than about 2000. The poly(ethylene glycol) may be present at a concentration of from about $10^{-6}$ to about $10^{-5}$ moles per gram of polymeric adhesive material. The electrophoretic medium may be an encapsulated electrophoretic medium in which the droplets are provided with capsule walls surrounding the suspending fluid and the electrically charged particles.

In another aspect, this invention provides an electro-optic display (the "modified polyurethane electro-optic" display of the invention) comprising first and second substrates, and an adhesive layer and a layer of electro-optic material disposed between the first and second substrates, the adhesive layer comprising a polyurethane adhesive having hydrophilic or polymerizable groups in the main chain of the polymer.

In another aspect, this invention provides an electrophoretic medium (the "modified polyurethane electro-optic" medium of the invention) comprising a plurality of droplets, each of the droplets comprising a suspending fluid and a plurality of electrically charged particles suspended in the suspending fluid and capable of moving therethrough on application of an electric field to the medium, the medium further comprising a binder surrounding the droplets, the binder comprising a polyurethane adhesive having hydrophilic or polymerizable groups in the main chain of the polymer. The electrophoretic medium may be an encapsulated electrophoretic medium in which the droplets are provided with capsule walls surrounding the suspending fluid and the electrically charged particles.

This invention also relates to the use of thermal cross-linking agents in electro-optic displays, and components used in the production thereof. In one aspect, this invention provides an electro-optic display comprising:

- a layer of solid electro-optic material capable of changing at least one optical characteristic upon application of an electric field thereto;
- a backplane comprising at least one electrode arranged to apply an electric field to the layer of electro-optic material; and
- an adhesive layer disposed between the layer of electro-optic material and the backplane and adhesively securing the layer of electro-optic material to the backplane, the adhesive layer comprising a thermally-activated cross-linking agent capable, upon exposure to an activation temperature, of cross-linking the adhesive layer.

In such a "cross-linkable adhesive layer" display, the adhesive layer may comprise a polyurethane. The cross-linking agent may comprise an epoxy group, which may be in the form of a glycidyl grouping (i.e., an epoxymethyl grouping). The cross-linking agent may also comprise a tertiary amine. For example, the cross-linking agent may comprise N,N-diglycidylaniline, which may be present in the adhesive layer in a concentration of at least about 5,000, and preferably at least about 10,000, parts per million by weight. Other useful types of cross-linking agents include epoxy ethers of alkyl or cycloalkyl polyols having at least two hydroxyl groups, and polymers having a main chain and a plurality of epoxy groups depending from the main chain. Specific useful cross-linking agents include 1,4-cyclohexanedimethanol diglycidyl ether, neopentyl glycol diglycidyl ether, O,O,O-triglycidylglycerol, and homopolymers and copolymers of glycidyl methacrylate.

This invention also provides a process for producing an electro-optic display, the process comprising:

- providing an assembly comprising a layer of solid electro-optic material capable of changing at least one optical characteristic upon application of an electric field thereto; a backplane comprising at least one electrode arranged to apply an electric field to the layer of electro-optic material; and an adhesive layer disposed between the layer of electro-optic material and the backplane and adhesively securing the layer of electro-optic material to the backplane, the adhesive layer comprising a thermally-activated cross-linking agent capable of cross-linking the adhesive layer, and
- exposing the adhesive layer to a temperature sufficient to activate the cross-linking agent, thereby cross-linking the adhesive layer.

This invention also provides an electro-optic display comprising:

- a layer of solid electro-optic material capable of changing at least one optical characteristic upon application of an electric field thereto;
- a backplane comprising at least one electrode arranged to apply an electric field to the layer of electro-optic material; and
- an adhesive layer disposed between the layer of electro-optic material and the backplane and adhesively securing the layer of electro-optic material to the backplane, the adhesive layer having been cross-linked by a thermally-activated cross-linking agent.

This invention also provides an article of manufacture (a front plane laminate) comprising in order:

- a light-transmissive electrically-conductive layer;
- a layer of a solid electro-optic medium in electrical contact with the electrically-conductive layer;
- an adhesive layer; and
- a release sheet,
- the adhesive layer comprising a thermally-activated cross-linking agent capable, upon exposure to an activation temperature, of cross-linking the adhesive layer.

This invention also provides an article of manufacture (a double release film) comprising:

- a layer of a solid electro-optic medium having first and second surfaces on opposed sides thereof;
- a first adhesive layer on the first surface of the layer of solid electro-optic medium;
- a release sheet disposed on the opposed side of the first adhesive layer from the layer of solid electro-optic medium; and
- a second adhesive layer on the second surface of the layer of solid electro-optic medium,
- wherein at least one of the first and second adhesive layers comprises a thermally-activated cross-linking agent capable, upon exposure to an activation temperature, of cross-linking the adhesive layer in which it is present.

The aforementioned front plane laminate and double release film of the present invention may include any of the optional features or such front plane laminates and double release films described in the aforementioned applications. Thus, for example a front plane laminate of the present invention may include a conductive via in contact with the conductive layer of the front plane laminate and extending through the electro-optic medium thereof, and a contact pad in contact with the conductive via and arranged to contact an electrode provided on a backplane to which the front plane laminate is to be laminated.

In another aspect, this invention provides a process for the preparation of an electro-optic display, the process comprising:

- forming a layer of an electro-optic material on an electrode;
- depositing a layer of a substantially solvent-free polymerizable liquid material over the layer of electro-optic material; and
- exposing the polymerizable liquid material to conditions effective to cause polymerization of the material, thereby forming a polymeric layer overlying the layer of electro-optic material.

The display thus produced is intended to be written with a stylus. In such a process, the polymerizable liquid material may be thermally curable and the conditions effective to cause polymerization of the material may comprise heating the liquid material to a temperature high enough to cure the material. Alternatively, the polymerizable liquid material may be radiation curable and the conditions effective to cause polymerization of the material may comprise exposing the liquid material to radiation of a wavelength effective to cure the material; those skilled in the technology of solvent-free polymerizable liquid materials will be aware that typically the polymerizing radiation is in the ultra-violet. The polymerizable liquid material may comprise an acrylate or a urethane acrylate blend or a silicone.

The process may comprise controlling the thickness of the layer of polymerizable liquid material deposited on the layer of electro-optic material. The thickness of the layer of polymerizable liquid material may be controlled by doctor blade or die coating. Alternatively, the thickness of the layer of polymerizable liquid material may be controlled by contacting the layer of liquid material with a release sheet and passing a nip roller over the release sheet prior to polymerizing the liquid material.

For reasons already explained, it is desirable to keep the thickness of the final polymeric layer as small as possible, consistent with good protection for the electro-optic material. Accordingly, the thickness of the polymeric layer may be from about 6 to about 250 µm, and preferably from about 8 to about 50 µm. In some cases, the layer of electro-optic material formed on the electrode has a non-planar exposed surface and the final polymeric layer planarizes the layer of electro-optic material so that the exposed surface of the final polymeric layer is substantially planar.

The electro-optic material used in the present process may be of any of the types discussed above. Thus, for example, the electro-optic material may comprise a rotating bichromal member or electrochromic material. Alternatively, the electro-optic material may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrophoretic material may be of the polymer-dispersed type, with the electrically charged particles and the fluid present as a plurality of discrete droplets surrounded by a continuous phase comprising a polymeric material. The fluid may be liquid or gaseous.

This invention also provides an electro-optic display capable of being imaged by a stylus, the display comprising: an electrode; a layer of an electro-optic material disposed on the electrode; and a polymeric layer overlying the layer of electro-optic material, the polymeric layer comprising the polymerization product of a substantially solvent-free polymerizable liquid material.

DETAILED DESCRIPTION

Figure 1:
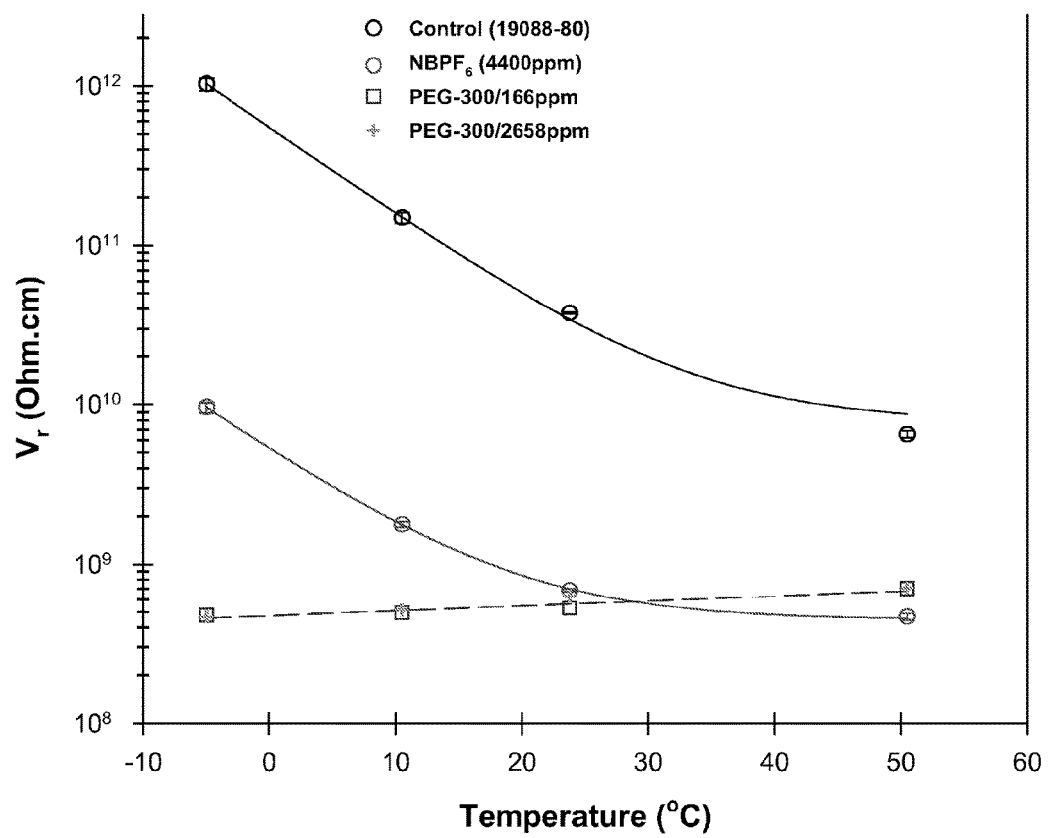
FIG. 1 of the accompanying drawings is a graph showing the variation of volume resistivity with temperature for certain polyurethane adhesives useful in low molecular weight polymer displays of the invention.

As already mentioned, the present invention provides several different improvements in adhesives (and in some cases binders) used in electro-optic displays. The various aspects of the present invention will be described separately below, although it should be understood that a single display may make use of more than one aspect of the present invention.

Low Molecular Weight Polymer Display and Medium

As already mentioned, a first aspect of the present invention relates to a electro-optic display having an adhesive layer comprising a mixture of a polymeric adhesive material and a low number average molecular weight ($M_n$ not greater than about 5000) hydroxyl containing polymer. A preferred polymer for this purpose is poly(ethylene glycol) (PEG). desirably having $M_n$ not greater than about 2000. In effect, the polymer additive serves the same function as the salt or other polyelectrolyte used in the aforementioned copending application Ser. No. 10/810,761. However, the use of the polymer additive appears likely to cause fewer corrosion problems that the use of a salt. It has also been found that the use of the polymer additive improves the operating temperature range of the display by reducing the variation of the volume resistivity of polyurethane adhesive materials with temperature in a way which the use of salt additives does not. The optimum concentration of hydroxyl containing polymer additive for any particular system is best determined empirically, but by way of general guidance it may be said that the optimum concentration of typically around $10^{-6}$ to $10^{-5}$ moles per gram of polymeric adhesive material cf. the relevant Examples below.

The low molecular weight polymer display of the invention may make use of any of the types of electro-optic media discussed above.

EXAMPLE 1

Three different commercially available PEG's (with number average molecular weights, $M_n$ of 300, 1000, and 8000 g/mole respectively, purchased from Aldrich Chemical) were used at a concentration of 4400 ppm in a custom polyurethane adhesive. The concentration of 4400 ppm corresponds a molar concentration of $5.17 \times 10^{-6}$ for PEG-300, $1.55 \times 10^{-6}$ for PEG-1000, and $1.94 \times 10^{-7}$ for PEG-8000. To provide experimental samples closely simulating an encapsulated electrophoretic display, each polyurethane/

PEG mixture was coated at a thickness of 30±2 μm on to a 7 mil (177 μm) poly(ethylene terephthalate) (PET) film coated with ITO, the mixture being coated on to the ITO-covered surface of the film. To provide experimental test units suitable for use in these experiments, pieces of the resultant adhesive-coated film were then laminated at 120° C. and 65 psig (approximately 0.5 mPa) at a speed of 6 inches/minute (approximately 2.5 mm/sec) to a 5 cm by 5 cm PET film covered with a carbon black layer, which served as the rear electrode of the test unit (which was essentially an encapsulated electrophoretic display with the capsule layer itself omitted). At least four test units were used for each experiment and all test units were conditioned at 30° C. and 30 percent relative humidity for 116 hours before testing; previous experiments had shown that this conditioning was sufficient for the adhesive to reach relative humidity equilibrium. The volume resistivity (Vr) of the adhesive in each test unit was then tested at 25° C. and 30 percent relative humidity using a standard industrial testing apparatus. To provide controls, test units were prepared containing the same polyurethane adhesive with no additive, and the same polyurethane adhesive with the addition of 4400 ppm of tetrabutylammonium hexafluorophosphate (abbreviated "$NBu_4PF_6$" in the Table below). The results are shown in the Table below. For simplicity, experimental uncertainty in each sample is omitted; however, the error is, in general, no greater than ±15%.

The last column of the Table shows the theoretical maximum moisture content of each material assuming that in the PEG-containing samples the site for moisture uptake is the terminal hydroxyl groups, since it appears unlikely that any significant amount of water will be bound by the ether linkages within the polymer chain. The maximum moisture content of the sample containing tetrabutylammonium hexafluorophosphate was calculated assuming from 1 to 5 moles of water of crystallization.

TABLE 1

| Dopant | Conc. ($\times 10^6$ mole/g, dispersion) | Vr ($\times 10^{-9}$ Ω cm) | Moisture content (ppm) |
|---|---|---|---|
| None | 0.00 | 60 | N/A |
| $NBu_4PF_6$ | 6.40 | 0.68 | 50-230 |
| PEG (300) | 5.17 | 0.42 | 500 |
| PEG (1000) | 1.55 | 0.46 | 160 |
| PEG (8000) | 0.19 | 44 | 20 |

From the data in Table 1, it will be seen that the PEG-300 and PEG-1000 were at least as effective as the tetrabutylammonium hexafluorophosphate in reducing the volume resistivity of the polyurethane adhesive, whereas the PEG-8000 had little effect on the volume resistivity. This is consistent with the maximum theoretical water content of the samples. An alternative explanation is that the PEG-8000 is far less effective than the PEG-300 and PEG-1000 in plasticizing the polyurethane adhesive.

EXAMPLE 2

As already mentioned, the addition of low molecular weight hydroxyl-containing polymers improves the variation of the volume resistivity of polyurethane adhesives with temperature in a manner which the addition of salts does not. A second series of experiments were conducted to illustrate this behavior. Test units were prepared and conditioned in the same way as in Example 1 except that the conditioning was performed for a minimum of only 100 hours, and that the test units contained only no additive, 4400 ppm of tetrabutylammonium hexafluorophosphate, or 166 or 2658 ppm of PEG-300. Volume resistivity measurements were then conducted at temperatures from −5° C. to 50° C., in all cases at 30 percent relative humidity. The results are shown in FIG. 1 of the accompanying drawings; no error bars are shown in this Figure since experimental error is in general less than the size of the symbols used to mark the data points.

From FIG. 1, it will be seen that the volume resistivity of the undoped adhesive falls by about two orders of magnitude over the 55 C.° temperature range used; this behavior is typical for polyurethane adhesives. The tetrabutylammonium hexafluorophosphate doped adhesive has a volume resistivity about two orders of magnitude lower than that of the undoped adhesive at the same temperature, but the overall shape of the volume resistivity curve for the salt doped adhesive closely resembles that of the curve for the undoped adhesive. In contrast, both PEG doped adhesives show a volume resistivity which varies little with temperature over the temperature range used; indeed, the volume resistivity of the PEG doped adhesive increased slightly with temperature. Since the increase in volume resistivity of polyurethane adhesives at low temperatures is a major factor limiting the performance of electro-optic displays using such adhesives at low temperatures, the results shown in FIG. 1 indicate that use of PEG doped polyurethane adhesives should result in a significant improvement in the low temperature performance of such electro-optic displays.

From the foregoing, it will be seen that the low molecular weight polymer display and electro-optic medium of the present invention provides a means for controlling the volume resistivity of adhesives used in electro-optic displays which reduces any possible corrosion problems which may be associated with the addition of salts to such adhesives. Also, they provide a means for rendering the volume resistivity of adhesives used in electro-optic displays relatively insensitive to temperature changes, thereby potentially improving the range of conditions under which such displays can operate. Finally, because of the relationship between the properties required in an adhesive and a binder for use in an encapsulated electrophoretic medium, the use of a low molecular weight polymer medium of the present invention as a binder in encapsulated electrophoretic media used in electro-optic displays should give advantages similar to those achieved to its use as an adhesive in electro-optic displays.

Modified Polyurethane Electro-Optic Display and Medium

As already mentioned, a further aspect of the present invention provides an electro-optic display comprising first and second substrates, and an adhesive layer and a layer of electro-optic material disposed between the first and second substrates, the adhesive layer comprising a polyurethane adhesive having hydrophilic or polymerizable groups in the main chain of the polymer.

Figure 2:
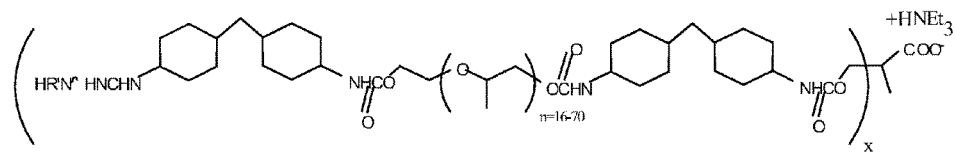
FIG. 2 shows the formula of one group of polyurethanes useful in modified polyurethane electro-optic displays and media of the present invention.

The structure of a typical polyurethane suitable for use in an aqueous polyurethane dispersion used as an adhesive in an electro-optic display is shown in FIG. 2 of the accompanying drawings. In this Figure, "HRN-" indicates chain extension using 1,6-hexanediamine, while "$COO^-/NH^+(Et)_3$" represents neutralization of a carboxylic acid group, derived from dimethylol propionic acid with triethylamine. The overall procedure for preparing such a polyurethane typically comprises four steps:

(a) the preparation of a prepolymer by reaction of a polyol (for example, poly(propylene glycol)) with a molar excess of a diisocyanate (for example, hydrogenated diphenyl methane diisocyanate);

(b) reaction of the prepolymer with a carboxylic acid containing a diol grouping (for example dimethylol propionic acid);

(c) neutralization of the carboxylic acid group introduced in step (b) with a tertiary amine (for example, triethylamine); and (d) chain extension using a diamine or a diol (for example, 1,6-hexanediamine or 1,4-butanediol).

Each of these four steps can critically affect the properties of the final polyurethane adhesive, which renders synthesis of a polyurethane adhesive having optimum properties for any particular application very complicated. For example, by controlling the molecular weight of the poly(propylene glycol) used in step (a), the molecular weight of the final polyurethane can be controlled. Also, it is well known to those skilled in polyurethane chemistry that the mechanical properties, such as modulus and elongation, of the final polyurethane depend strongly upon the isocyanate/hydroxyl ratio in step (a). In step (b), the amount of dimethylol propionic acid affects the weight average molecular weight ($M_w$), particle size and zeta potential of the final polyurethane dispersion; typically, as the content of dimethylol propionic acid increases, $M_w$ decreases, the particle size decreases and the zeta potential increases. In step (c), the degree of neutralization is a governing factor for the particle size of the final polyurethane dispersion; at optimum neutralization, the particle size is at a minimum. Finally, step (d) is known to the most effective stage for controlling the molecular weight of the final polyurethane.

The results previously discussed, relating to the effects of ionic and low molecular weight polymers as additives to control the volume resistivity of adhesives, indicate that similar effects can be achieved without the use of additives by incorporating hydrophilic and/or polarizable groups into the polyurethane structure. The incorporation of such groups can be achieved in several ways. Polymerization of the main chain of the polyurethane can be effected with excess hydrophilic or polarizable functionality; for example, this may be effected by performing chain extension using excess diol instead of diamine, thus introducing hydroxyl groups into the polymer. Introduction of polyols with functionality greater than two in step (a), (b) or (c) may result in chemical cross-linking of the polymer; however, caution should be exercised in using this approach since the material properties of the final polyurethane may be significantly affected. Alternatively, the hydrophilicity and/or polarizability of the final polyurethane can also be affected by the degree of neutralization in step (c), i.e., the molar ratio of triethylamine to dimethylol propionic acid; an increased degree of neutralization will tend to decrease the volume resistivity of the polyurethane and it is expected that the magnitude of the volume resistivity will be a quantitative measure of the degree of neutralization.

Again, because of the relationship between the properties required in an adhesive and a binder for use in an encapsulated electrophoretic medium, the use of a modified polyurethane as a binder in encapsulated electrophoretic media used in electro-optic displays should give advantages similar to those achieved to its use as an adhesive in electro-optic displays.

The modified polyurethane display of the invention may make use of any of the types of electro-optic media discussed above.

Modification of the polyurethane in accordance with this aspect of the present invention offers benefits similar to those already discussed with reference to the use of ionic and low molecular weight polymer additives in polyurethanes, but with a minimal risk of corrosion problems in the final display, and without the risk than an additive might separate or diffuse away from the adhesive layer.

Cross-Linkable Adhesive Layer Display, and Related Aspects of the Invention

As already indicated, one aspect of the present invention relates to the use, in an adhesive layer of an electro-optic display, of a thermally-activated cross-linking agent capable of cross-linking the adhesive layer. This invention also provides a process for producing an electro-optic display with a cross-linked adhesive layer, an electro-optic display produced by such a process, and components (namely a front plane laminate and a double release film) useful for forming such displays. The use of such a thermally-activated cross-linking agent has been found effective in avoiding the formation of voids in electro-optic displays.

The cross-linking agent should be chosen so that, upon prolonged exposure to elevated temperatures, the cross-linking agent will substantially cross-link the adhesive, since it has been found that such cross-linking is effective in eliminating (or at least greatly reducing) the formation of voids when electro-optic displays are exposed to elevated temperatures for prolonged periods. Also, as already indicated, the cross-linking agent should be chosen so that little or no cross-linking of the adhesive occurs during the lamination(s) used to manufacture the electro-optic display. Although a minor degree of cross-linking can be tolerated during the lamination of the electro-optic material to the backplane (see the extended discussion below), it appears to be important that the adhesive retain the ability to flow during this lamination in order to secure good adhesion of the electro-optic material to the backplane. Indeed, during the "double lamination" process described in the aforementioned 2004/0027327, a lamination adhesive will typically undergo adhesive coating, drying, lamination to the electro-optic material, and lamination to the backplane. Three of these steps involve high temperature processing (typically at 60 to 120° C.), so for optimum processing cross-linking should not occur until after the part is manufactured or at a very slow rate such that processing such an adhesive is not an issue.

When, as is typically the case, the adhesive used in a polyurethane adhesive, the cross-linking agent desirably contains one or more epoxy groups, which may be in form of glycidyl groupings. Several different types of epoxy compounds have been found useful. For example, the cross-linking agent may be a tertiary amine, a specific preferred cross-linking agent of this type being N,N-diglycidylaniline (hereinafter abbreviated "DGA"). However, since DGA is an aniline derivative, there may be health and safety concerns about the use of this material, especially in a commercial product. In addition, the stability of aniline derivates against ultra-violet radiation is generally poor, so incorporation of DGA may effect the long-term performance of displays exposed to such radiation, for example outdoor displays exposed to sunlight. Hence, alternative cross-linking agents have been sought.

Figure 3:
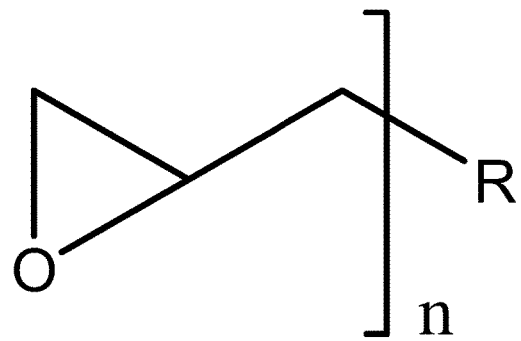
FIG. 3 shows the chemical formula of one preferred group of thermally-activated cross-linking agents for use in the cross-linkable adhesive layer displays of the present invention.
Figure 4:
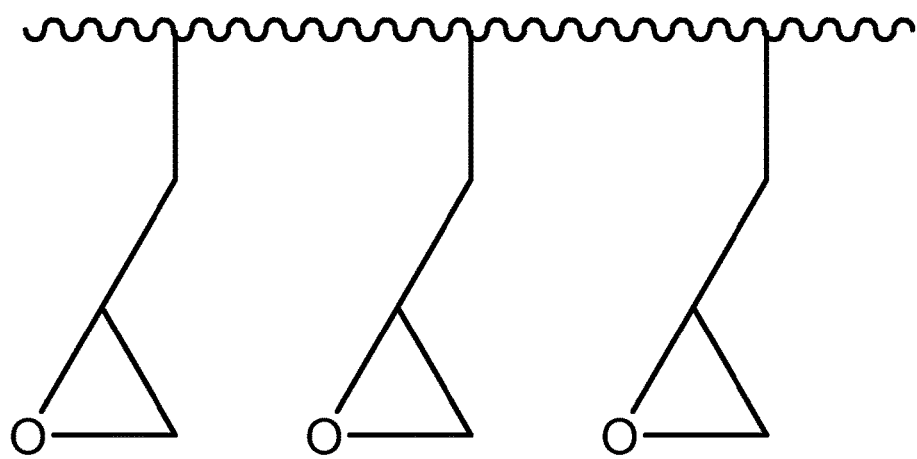
FIG. 4 shows the chemical formula of a second preferred group of thermally-activated cross-linking agents for use in the same displays.

The ability of DGA to cross-link polyurethane adhesives is attributable to nucleophilic attack of the epoxy group in the glycidyl grouping of DGA on carboxylic acid groups on the polyurethane backbone. Accordingly, other molecules containing such epoxy groups and capable of being dispersed in a polyurethane adhesive phase may be used in place of DGA. Preferred epoxy-containing compounds for use as cross-linking agents include small molecules with multiple epoxy groups, for example those of the Formula shown in FIG. 3, where n is two or more and R represents any chemical structure that connects to the epoxy group. Such compounds include glycidyl ethers of an alkyl or cycloalkyl diol or higher polyol, for example 1,4-cyclohexanedimethanol diglycidyl ether (CHDDE), neopentyl glycol diglycidyl ether (NGDE) and O,O,O-triglycidyl glycerol (TGG). A second group of such cross-linking agents are polymers having a main chain and a plurality of epoxy groups depending from the main chain (and optionally linked to the main chain via linking groups, for example polymethylene groups), as schematically illustrated in FIG. 4. Examples of suitable polymers include homopolymers and (random or block) copolymers of glycidyl methacrylate.

The optimum amount of cross-linking agent for use in any specific adhesive composition is best determined empirically. However, by way of general guidance it may be stated that a cross-linking agent concentration of at least about 100 ppm (w/w based on the weight of the adhesive composition) is typically needed, and generally at least about 1000 ppm. In many cases, the optimum proportion of cross-linking agent is greater than about 10000 ppm. In the case of DGA, a proportion of 15000 ppm or more is generally desirable to provide sufficient mechanical strength in the cross-linked adhesive to prevent void growth.

In some cases, it may be advantageous to use, in an electro-optic display, a lamination adhesive which contains both a hydroxyl containing polymer (or an ionic dopant) as described above, and a cross-linking agent. This combination may be especially useful when the display is a hybrid display, that is one built using front and back materials that have substantially different mechanical properties.

As described in copending application Ser. No. 10/904,063, filed Oct. 21, 2004 (see also the corresponding International Application PCT/US04/35261), it is challenging to design and build hybrid electronic displays (that is, displays built using front and back materials that have fundamentally different mechanical properties) in such a manner as to prevent the formation of cell curl (or warping) during manufacture or during the working lifetime of the display. This problem is compounded when a thermally-activated cross-linking agent is included in the lamination adhesive in accordance with the present invention. When such cross-linking agents are used, the display cell needs to be heated to elevated temperature for some time to activate the lamination adhesive, and such heating tends to considerably aggravate curl problems in the display cell.

Accordingly, this invention provides a modification of the manufacturing processes described in copending application Ser. No. 10/904,063 to adapt them for use with lamination adhesives containing thermally-activated cross-linking agents. This invention also provides means for controlling the volume resistivity and other properties of lamination adhesives containing thermally-activated cross-linking agents.

When using the processes described in U.S. Pat. No. 7,110,164 with lamination adhesives containing thermally-activated cross-linking agents, there are three main considerations:

1. the degree of heat stabilization required for plastic films used in the display;
2. based upon overall system integration issues, the preferred process flow for constructing the display, and
3. the proper ordering of temperature and time scales to ensure optimal integration of a thermally activated adhesive cross-linker into hybrid display assembly processes.

These three considerations will now be discussed separately.

1. Dimensional Stability

As described in the aforementioned copending application Ser. No. 10/904,063, it is highly desirable that a hybrid display be constructed using materials, such as polymeric films, that are heat stabilized and have known coefficient of thermal expansion (CTE) and coefficient of relative humidity expansion (CHE) values. Preferably, the dimensional stability properties are approximately the same in both directions (in the case of polymeric films provided in roll form, roll length versus roll width). The degree of heat stabilization of commercial polymeric films varies considerably from manufacturer to manufacturer, as well as among various material types from the same manufacturer. The polymeric film should very desirably have very long time dimensional stability at high temperature (desirably greater than or equal to 130° C., and preferably greater than or equal to 150° C., for many hundreds of hours, say at least about 500 hours) leading to smaller dimensional changes than those caused by CTE effects at the highest temperature environmental test limits (typically 100° C.).

For example, appropriate materials for a typical display are heat stabilized poly(ethylene terephthalate) (PET) (Melinex grade 504, from Du Pont Teijin Films, Wilmington, Del.; "MELINEX" is a registered trade mark) and high performance borosilicate glass (1737, from Corning Incorporated, Corning, N.Y.). For this PET, we have:

CTE=18 ppm/° C.

CHE=7 ppm/% RH, and for the glass

CTE=3.76 ppm/° C.

Also, the manufacturer notes that the PET experiences residual shrinkage of about 0.2% after 30 minutes exposure at 150° C.

Due to CTE affects, heating the PET from room temperature to 100° C. will cause the PET to experience dimensional change of 1350 ppm or about 0.14% (18 ppm/° C.×75 C.°). In order to ensure that irreversible dimensional change due to residual shrinkage does not play a role in the display mechanics during extended periods of high temperature exposure, it is desirable to ensure that residual shrinkage is notably smaller than this value. Thus, residual shrinkage at 100° C. should never exceed about 0.14% for, say, many hundreds of hours at 100° C. In addition, any individual assembly processes that expose the PET to even higher temperatures (e.g. lamination of electro-optic medium film to adhesive, preferably effected at 120-130° C.) should not contribute to significant additional residual shrinkage.

In order to ensure that the PET film does not experience excessively large shrinkage during display manufacture, it is known that the film can be heat stabilized to varying degrees by a number of methods known to those skilled in the field. For example, after several hundred hours at 150° C., the rate of change in dimensional change can be made to virtually vanish (rate of change less than 1 ppm/hr) as described in N.D. Young, et al, AMLCDs and Electronics on Polymer Substrates, Euro Display 1996, pp. 555-558.

2. Preferential Process Flows

When using a lamination adhesive containing a thermally-activated cross-linking agent in accordance with the present invention, there are four process variants of practical interest:

1. cross-linking the adhesive through thermal exposure for a fixed time after coating of the adhesive on a support but before lamination of the adhesive to the electro-optic medium;

2. cross-linking the adhesive through thermal exposure for a fixed time after lamination to the electro-optic medium, but before lamination of the adhesive (typically in the form of a front plane laminate, as described above) to a backplane;
3. cross-linking the adhesive through thermal exposure for a fixed time after lamination of the adhesive (typically in the form of a front plane laminate) to the backplane but before the display is edge sealed (see the aforementioned 2004/0027327 for discussion of the practical importance of edge sealing in the manufacture of electro-optic displays); and
4. cross-linking the adhesive through thermal exposure for a fixed time after the display is fully constructed, possibly as part of a final edge seal post-bake process.

It is of course be recognized by those skilled in constructing electro-optic displays that each process that exposes an adhesive containing a thermally-activated cross-linking agent to any temperature and time (including room temperature exposure) will advance the cross-linking reaction. As examples of thermal exposure conditions, one may consider temperatures of between 40° C. and 90° C. for times between 10 minutes and 100 hours, more preferably between 1 hour and 30 hours, and most preferably between 1 hour and 10 hours.

Process variant 1 above is not desirable, as the adhesive will stiffen considerably upon cross-linking and will therefore make the lamination process difficult and possibly prohibitively difficult.

Process 2 variant has the advantage of stiffening the adhesive while it is (typically) held in intimate contact with a release layer so that it maintains a high degree of flatness during handling, processing, etc. If suitable flatness is preserved on the FPL, lamination to the backplane is possible despite the increase in stiffness of the adhesive. Therefore, this variant is practical as long as the cross-linking agent chemistry leads to suitable adhesive strength after lamination to the backplane.

Process variant 3 is desirable, because it allows the adhesive to stay soft during all lamination operations, but to be stiffened once the laminations are complete. This process variant is also desirable because it allows an FPL/backplane combination (for example, a combination using a glass backplane) to reach an equilibrium state before proceeding further to the final display. This is desirable especially if the cross-linking reaction leads to an adhesive system bulk volume change (either densification or rarification).

Process variant 4 is also desirable, because (a) the adhesive is soft during all lamination processes, and (b) this process leads to a slight efficiency improvement over Process variant 3, since the adhesive cross-linking can be accomplished simultaneously with thermally-activated cross-linking of an edge seal adhesive. Note that a typical preferred edge sealant (e.g. Threebond 30Y-491 manufactured by ThreeBond Corporation, Cincinnati, Ohio) requires both ultra-violet and thermal curing.

In all the process variants considered, it is highly desirable that the PET or similar film used be heat stabilized as described above to ensure that the use of the cross-linking agent does not lead to a dramatic increase in display curl during the cross-linking step.

3. Process Temperature and Time Scale Ordering

When an adhesive composition containing a thermally-activated cross-linking agent is used in accordance with the present invention, it is important to ensure a proper choice of temperatures and time scales for all processes of interest to ensure that cross-linking of the adhesive proceeds at the desired rate. As an introductory matter, consider the process considerations shown in Table 2 below:

TABLE 2

Typical temperatures and exposure times for electro-optic display assembly processes

| Thermal Process | Typical temperature (° C.) | Typical time scale of exposure |
|---|---|---|
| Adhesive drying | 50 to 90 | minutes |
| Adhesive storage | 0 to 20 | months |
| Lamination of adhesive to electro-optic medium | 90 to 130 | minutes |
| FPL storage | 0 to 20 | months |
| Lamination of FPL to backplane | 60 to 110 | <1 minute |
| Edge seal dispense | 50 to 80 | 2 to 6 minutes |
| Edge seal UV cure | 30 to 80 | 2 to 5 minutes |
| Edge seal post-bake | 30 to 80 | 1 to 3 hours |
| High temperature testing | 60 to 100 | 5 to 30 days |

To use a thermally-activated cross-linking agent in preferred Process variant 3 or 4, in practice it is essential that:

(a) The time required for cross-linking at temperatures associated with the two laminations is much longer than the time scales for these laminations (minutes);

(b) The time required for residual film shrinkage at elevated temperatures during testing is much longer than the cross-linking time-scale, and residual shrinkage effects are much smaller than dimensional changes associated with CTE and CHE (see discussion above); and (c) The time scale for cross-linking is sufficiently short to be practical (shorter is better), but not so short as to allow for excessive cross-linking during various long term storage steps.

Obviously, the cross-linking reaction will proceed during the various process/storage steps listed in Table 2. As a specific example, for a particular cross-linking agent and adhesive, one may find that after the two laminations, the cross-linking reaction has proceeded to between 0.1% to 50% of completion. Subsequent steps, as described above, can advance the reaction until it reaches an acceptable level of completion.

The use of a cross-linked lamination adhesive combines the advantages of a soft adhesive that allows for facile, high throughput processing, but a firm adhesive that tightly holds the display together without allowing void growth at elevated temperature. The most obvious process risk is that the shelf life of the adhesive (and FPL, if used) is reduced and refrigeration of the adhesive may be desirable to maximize shelf life.

This invention also provides means for controlling the volume resistivity and other properties of lamination adhesives containing thermally-activated cross-linking agents. As already noted, the aforementioned U.S. Pat. No. 7,012,735 describes the use, in electro-optic displays, of binders and adhesive compositions the volume resistivity of which is reduced by the addition of a salt or polyelectrolyte, for example, tetrabutylammonium chloride; tetrabutylammonium hexafluorophosphate can advantageously be substituted. Cross-linking a lamination adhesive in accordance with the present invention substantially increases the volume resistivity of the adhesive. However, it has been found that adding a salt, polyelectrolyte or hydroxyl containing polymer to such a cross-lined adhesive can readily reduce the volume resistivity of the cross-linked adhesive to the most desirable range, producing a cross-linked adhesive having substantially the same volume resistivity as the uncross-linked adhesives described in the aforementioned U.S. Pat. No. 7,012,735. It has also been found that encapsulated electrophoretic displays made with such doped and cross-lined adhesives are useable across wider temperature and relative humidity ranges than similar prior art displays. The salt, polyelectrolyte or polymer used to decrease the volume resistivity may be any of those previously described, a particularly preferred combination being DGA as the cross-linking agent and tetrabutylammonium hexafluorophosphate as the volume resistivity reducing agent.

The following Examples are now given, though by way of illustration only, to show preferred reagents, conditions and techniques used in the cross-linkable adhesives of the present invention.

EXAMPLE 3

Cross-Linking of Polyurethane Adhesive with N,N-diglycidyl Aniline

A custom aqueous polyurethane dispersion having a solids content of about 35 percent by weight was coated on to a release sheet and dried in a conveyor oven at 60° C. for approximately 2 minutes, the coating weight of the dispersion being controlled so that an adhesive layer 15 μm thick was formed on the release sheet. To demonstrate the effect of a thermally-activated cross-linking agent, the dispersion used contained 20,000 ppm (based upon the solids content of the dispersion) of N,N-diglycidyl aniline (DGA).

Figure 5:
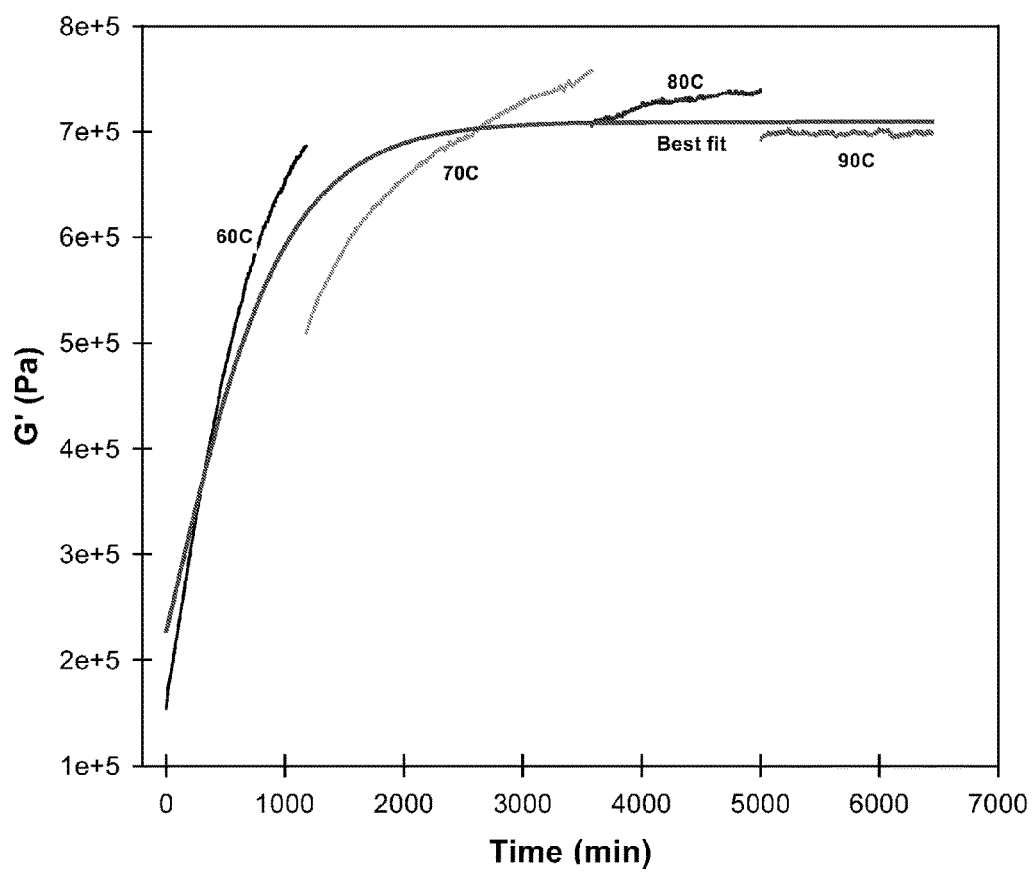
FIG. 5 is a graph showing the variation of shear modulus against time for certain adhesives containing thermally-activated cross-linking agents.
Figure 6:
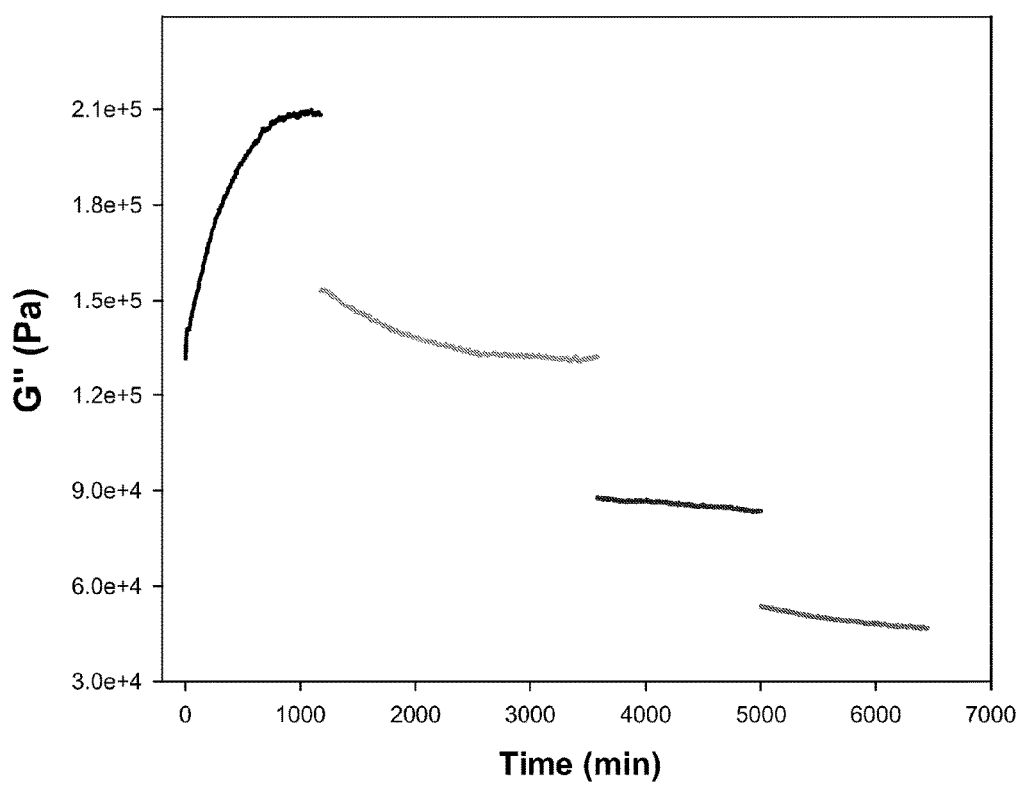
FIG. 6 is a graph showing the rate of change of the shear modulus with time for samples exposed to varying temperatures for the same adhesives as in FIG. 3.

The resultant adhesive layer was peeled from the release sheet and folded into multiple thicknesses to provide an adhesive layer sufficiently thick for shear modulus testing, which was conducted on a Dynamic Mechanical Analyzer, Model RH2000. A sample of the adhesive was exposed to a temperature of 60° C. for a period of 1000 minutes, then its temperature was raised successively to 70, 80 and 90° C., as shown in FIG. 5 of the accompanying drawings. A second sample was maintained at 60° C. for a period of 1440 hours. The shear modulus (G') of both samples was measured at intervals. In FIG. 5, the four separate lines show the measurements taken on the one sample at 60, 70, 80 and 90° C., as marked, while the continuous curve is the best fit to the separate lines. FIG. 6 shows the storage modulus (G"), the rate of change of the shear modulus with time) for the sample exposed to varying temperatures. The initial drop in modulus upon increasing the temperature shown in FIG. 5 is due to the inevitable decrease in shear modulus as the adhesive increases in temperature.

From the data in FIGS. 5 and 6, it will be seen that the thermal-activated cross-linking (curing) of the polyurethane adhesive by the DGA is relatively slow and strongly temperature-dependent. Although the relevant data are not shown in FIGS. 5 and 6, the sample maintained at a constant 60° C. was found not be completely cured after 1440 hours. Accordingly, no substantial curing of the DGA-containing polyurethane adhesive would occur during the relatively brief exposures to elevated temperatures which such an adhesive would undergo during manufacture of a typical electro-optic display cf. Example 4 below. However, upon prolonged exposure of such a display to elevated temperatures during use, thermal-activated cross-linking of the adhesive will occur.

EXAMPLE 4

Suppression of Void Formation of Displays

To provide experimental cross-linkable electrophoretic displays in accordance with the present invention, a slurry comprising gelatin/acacia capsules, containing a hydrocarbon suspending fluid and titania and carbon black electrophoretic particles, and a polymeric binder was prepared substantially as described in Paragraphs [0066] to [0072] of the aforementioned 2002/0180687. This slurry was then coated on to a 188 μm poly(ethylene terephthalate) (PET) film bearing on one surface a thin coating of ITO, the slurry being deposited on the ITO-covered surface of the film. The coated film was dried in a conveyor oven at 60° C. for approximately 2 minutes. Separately, a custom aqueous polyurethane dispersion having a solids content of about 35 percent by weight was coated on to a release sheet and dried in a conveyor oven at 60° C. for approximately 2 minutes, the coating weight of the dispersion being controlled so that an adhesive layer 15 μm thick was formed on the release sheet. The dispersion used contained either no additive (control) or 20,000 ppm (based upon the solids content of the dispersion) of DGA. The adhesive-coated release sheet was then laminated to the capsule-coated film to form a front plane laminate, this lamination being effected at 65 psig (0.56 mPa) at a speed of 6 inches/min (2.5 mm/sec) using a Western Magnum twin roll Laminator with both rolls held at 120° C. An optically clear adhesive was then coated over the exposed surface of the PET film (i.e., on the opposite side of this film from the capsules); for details regarding the use of the optically clear adhesive (OCA) and the final display structure produced below, the reader is referred to the aforementioned 2004/0027327, especially FIG. 20 and the related portion of the description.

To provide experimental single-pixel displays suitable for use in these experiments, pieces of the resultant front plane laminate has their release sheets removed and were then laminated at 75° C. and 72 psig (0.63 mPa) at a speed of 2 feet/min (10 mm/sec) using an Iyshiyama laminator to 5 cm by 5 cm pieces of glass covered with an ITO layer, the lamination being effected to the ITO-covered surface of the film. Following this second lamination, the laminates were stress relieved at room temperature for 4 hours. Finally, the OCA-covered surface of the laminates was laminated to a protective stack comprising a protective sheet, a first layer of low tack adhesive, a PET layer with an alumina coating facing the OCA, an OCA layer, a PET layer with an anti-glare/hard coat and a second layer of low tack adhesive, with the second layer of low tack adhesive being laminated to the OCA of the laminate. The resultant structure was then edge-sealed by dispensing a bead of an edge sealant around the periphery of the sheet.

Figure 7:
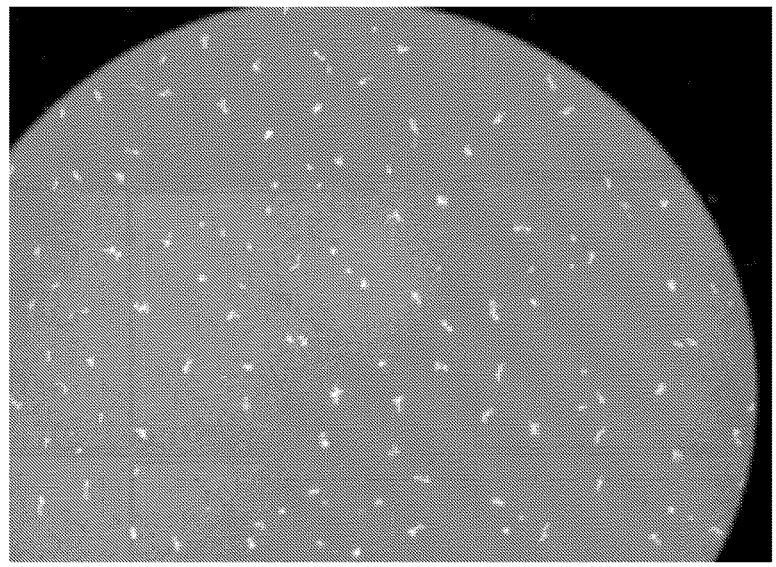
FIGS. 7 and 8 show the extent of void formation experienced with a control adhesive (FIG. 7) and a cross-linked adhesive (FIG. 8).
Figure 8:
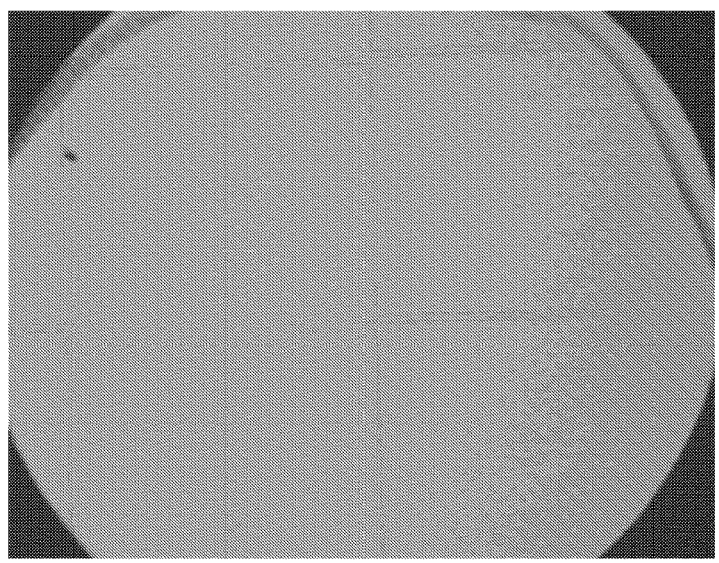

The resultant displays were then thermally stressed by being stored at 90° C. and 17 percent relative humidity for 15 hours and then switched to a dark optical state and photographed. The results are shown in FIGS. 7 and 8 of the accompanying drawings, with FIG. 7 showing a control display in which the polyurethane adhesive did not contain any DGA, and FIG. 8 showing a display of the present invention in which the adhesive did contain this additive. It will be seen from FIG. 7 that the control display displayed numerous white areas indicating the presence of voids, whereas FIG. 8 shows that the display of the present invention was free from voids.

EXAMPLE 5

Lamination Adhesives Using Various Cross-Linking Agents

Figure 9:
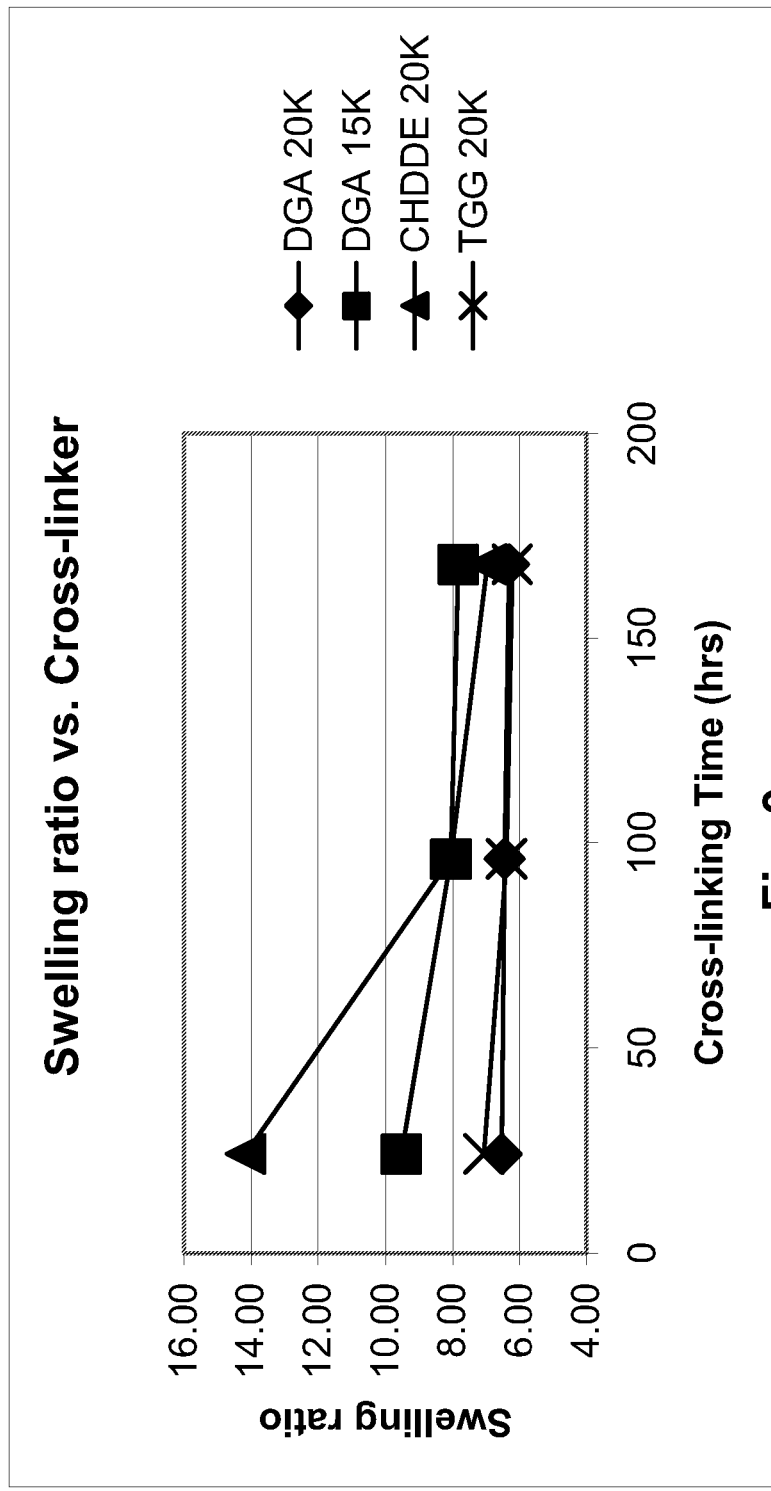
FIG. 9 is a graph showing swelling ratio against time of various adhesive films containing thermally-activated cross-linking agents.

Samples of cross-linkable lamination adhesives were prepared in substantially the same way, and using the same custom polyurethane, as in Example 3 above, except that the adhesives were coated at a thickness of 25 μm. As in Example 3, the coated adhesive films were peeled from the substrate and folded multiple times to provide samples 10 mm square and 1 mm thick, which were cross-linked in an oven at 70° C. for varying periods. After this cross-linking reaction, the samples were swollen in HPLC grade acetone at 25° C. for at least 24 hours to reach equilibrium. After equilibrium swelling of the samples had been achieved, acetone adsorbed on the surface of the samples was removed with tissue paper, and the samples were weighed. Finally, the samples were again weighed after being completely dried in a 60° C. oven for 24 hours to remove all solvent. The equilibrium mass swelling ratio was calculated from the ratio of the equilibrium swollen mass to the polymer dry mass, and the results are shown in FIG. 9.

The samples used contained 15000 or 20000 ppm (w/w based on the solids content of the polyurethane adhesive) of DGA, and 20000 ppm of either CHDDE or TGG. Since a lower swelling ratio corresponds to a higher cross-linking density and thus a higher mechanical strength of the adhesive film, the data plotted in FIG. 9 show that adhesive films cross-linked with CHDDE and TGG have mechanical strengths comparable to those achieved with DGA, and are thus able to prevent void formation.

Figure 10:
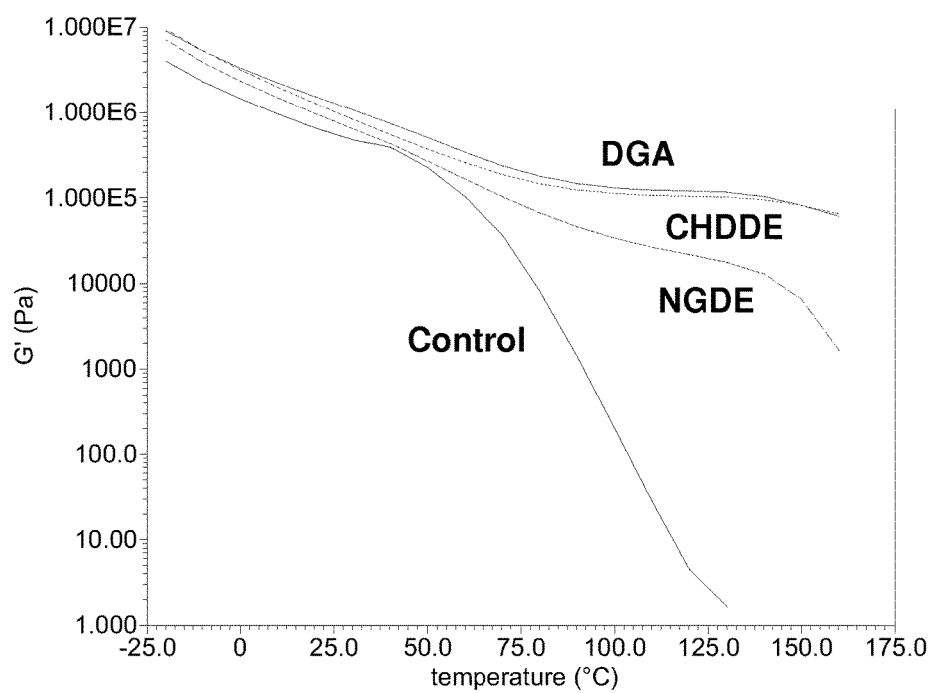
FIG. 10 is a graph showing storage modulus against time for various adhesive films containing thermally-activated cross-linking agents.

The storage modulus (G") of the adhesives was also measured for a control sample and for the three samples containing 20000 ppm of the various cross-linking agent, the storage modulus being measured in the same way as in Example 3 above, and the results are shown in FIG. 10. From this Figure, it will be seen that the cross-linked adhesives showed considerable improvement in retention of mechanical strength, especially at temperatures greater than 25° C., as compared with the control. This improved retention of mechanical strength helps prevent void growth when electro-optic displays using the cross-linked adhesives are exposed to elevated temperatures.

Figure 11A:
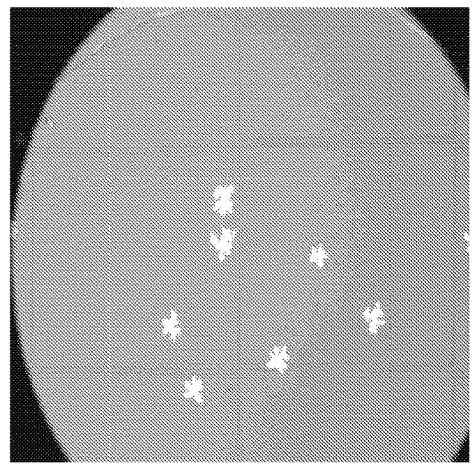
FIGS. 11A, 11B and 11C are views, similar to those of FIGS. 7 and 8, showing the extent of void formation experienced with a control adhesive (FIG. 11A) and cross-linked adhesives (FIGS. 11B and 11C).
Figure 11B:
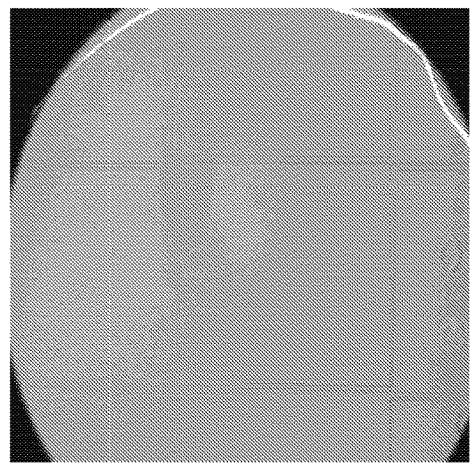
Figure 11C:
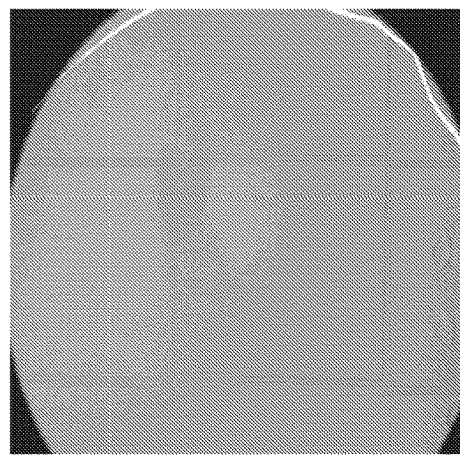

Finally, experimental displays prepared in the same way in Example 3 above were thermally stressed by being exposed to 70° C. and 23% relative humidity for 250 hours, and then visually inspected. Photographs of the results are shown in FIGS. 11A, 11B and 11C. From these Figures, it will be seen that a control sample without any cross-linking agent (FIG. 11A) displayed significant void growth after the thermal stress test, whereas samples containing 20000 ppm of DGA (FIG. 11B) and CHDDE (FIG. 11C) were free from voids after the test.

EXAMPLE 6

Lamination Adhesives Using Cross-Linking Agents and Ionic Additives

This Example illustrates the use of an ionic additive ("dopant") to control the volume resistivity of a cross-linkable adhesive used in displays of the present invention.

A series of displays were prepared in which the lamination adhesives were formulated with and without dopant, tetrabutylammonium hexafluorophosphate, $NBu_4PF_6$ and cross-linking agent, N,N-diglycidylaniline, DGA, as shown in Table 3 below.

TABLE 3

| Sample Code | Dopant Composition $NBu_4PF_6$ (ppm) | Dopant Composition DGA (ppm) | Note |
| --- | --- | --- | --- |
| C-L | 0 | 0 | Control |
| D-N | 1000 | 0 | Doped/uncross-linked |
| SC-0/43000 | 0 | 43000 | Cross-linked only |
| SC-500/43000 | 500 | 43000 | Low $NBu_4PF_6$/cross-linked |
| SC-1000/43000 | 1000 | 43000 | Medium $NBu_4PF_6$/cross-linked |
| SC-0/43000 | 4400 | 43000 | High $NBu_4PF_6$/cross-linked |

Experimental single pixel displays were prepared by coating an encapsulated electrophoretic medium on to an ITO-coated PET film, the medium being coated on to the ITO-covered surface of the film. The adhesive, comprising the same custom polyurethane adhesive as in previous Examples, with the specified additives, was coated on to a release sheet and dried to produce an adhesive coating 30-33 μm thick. The adhesive coated release sheet was then laminated to the electrophoretic medium to form a front plane laminate, which was cut into appropriately sized pieces. The release sheet was removed from the FPL pieces and the front plane laminate laminated to 2 inch by 2 inch (51 mm by 51 mm) polymeric films coated with a graphite electrode to form the final single pixel displays. The foregoing procedures were carried substantially as described in the aforementioned 2004/0027327. To enable volume resistivity measurements to be carried out on the experimental adhesives only, a similar series of experimental displays were prepared but with the electrophoretic medium omitted.

Prior to testing, all displays were cross-linked by being exposed to 80° C. and 20 percent relative humidity for 53 hours; although no cross-linking can occur in the samples not containing DAG, these displays were also exposed to the same conditions for experimental consistency. Subsequently, all displays were equilibrated at 25° C. and 30 percent relative humidity for two weeks, then tested to determine the volume resistivity (Vr) of the lamination adhesive and the average combined volume resistivity of the lamination adhesive and the electrophoretic medium. The results are shown in Table 4 below, in which all data are averages of four samples, and the largest contribution to experimental errors, sample to sample variation, was typically less than ±15 percent.

TABLE 4

| Sample Code | Vr (Ohm cm) Adhesive only | Vr (Ohm cm) Adhesive + medium |
| --- | --- | --- |
| C-L | $3.6 \times 10^{10}$ | — |
| D-N | $0.8–1 \times 10^9$ | $2.5 \times 10^{10}$ |
| SC-0/43000 | $1.1 \times 10^{11}$ | $7.0 \times 10^{10}$ |
| SC-500/43000 | $5.0 \times 10^8$ | $2.5 \times 10^{10}$ |
| SC-1000/43000 | $1.4 \times 10^9$ | $2.4 \times 10^{10}$ |
| SC-0/43000 | $1.2 \times 10^9$ | $1.0 \times 10^{10}$ |

From the data in Table 4, it will be seen that doping of the adhesive with the salt reduces the volume resistivity of the adhesive by a factor of about 30, while cross-linking of the adhesive without the addition of dopant increases the volume resistivity by a factor of about 3, and renders this volume resistivity too high for the cross-linked adhesive to be used in a practical electrophoretic display; as explained in the aforementioned E Ink and MIT applications, it is necessary to "balance" the volume resistivities of the adhesive and the electrophoretic medium so that the voltage drop across the adhesive layer does not become excessive. However, the addition of the dopant to the cross-linked adhesive reduced the volume resistivity of this cross-linked adhesive to substantially the same value as that doped, uncross-linked adhesive, i.e., the dopant reduces the volume resistivity of the cross-linked adhesive by a factor greater than that by which it reduces the volume resistivity of the uncross-linked adhesive.

Figure 12:
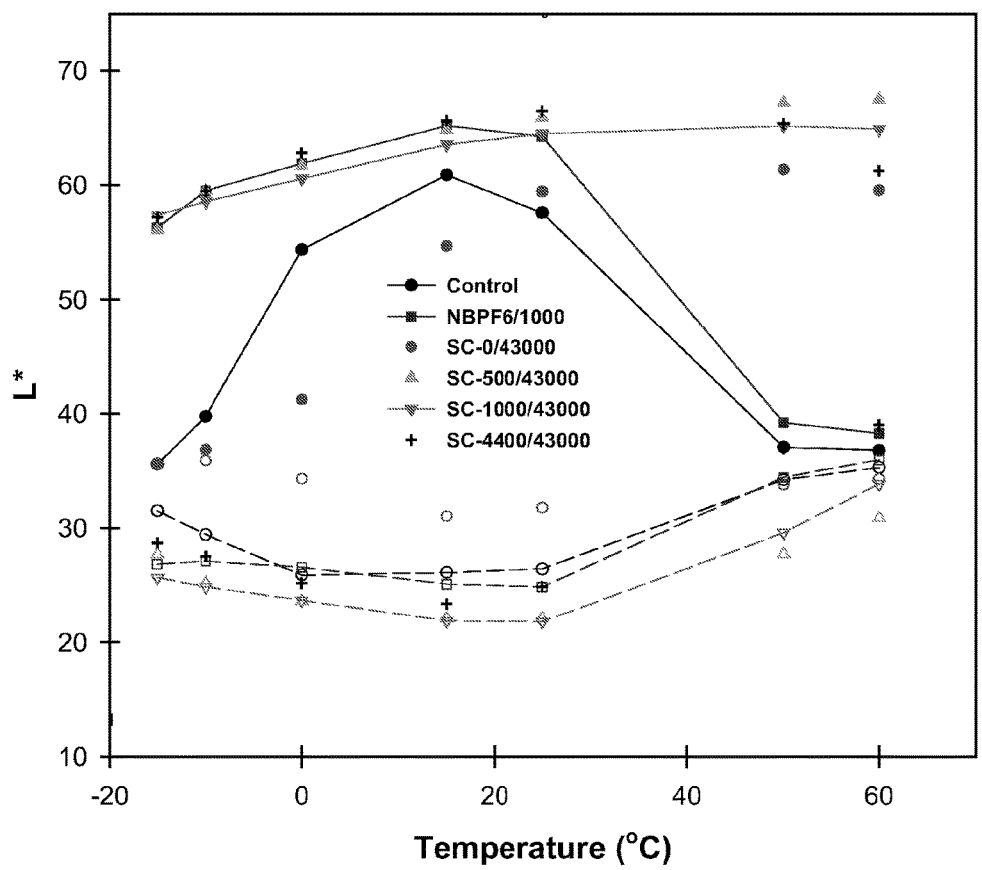
FIGS. 12 and 13 are graphs showing the variation with temperature of the electro-optic properties of displays of the present invention in which the adhesive layer contains both a cross-linking agent and a volume resistivity reducing agent, as described in Example 6 below.
Figure 13:
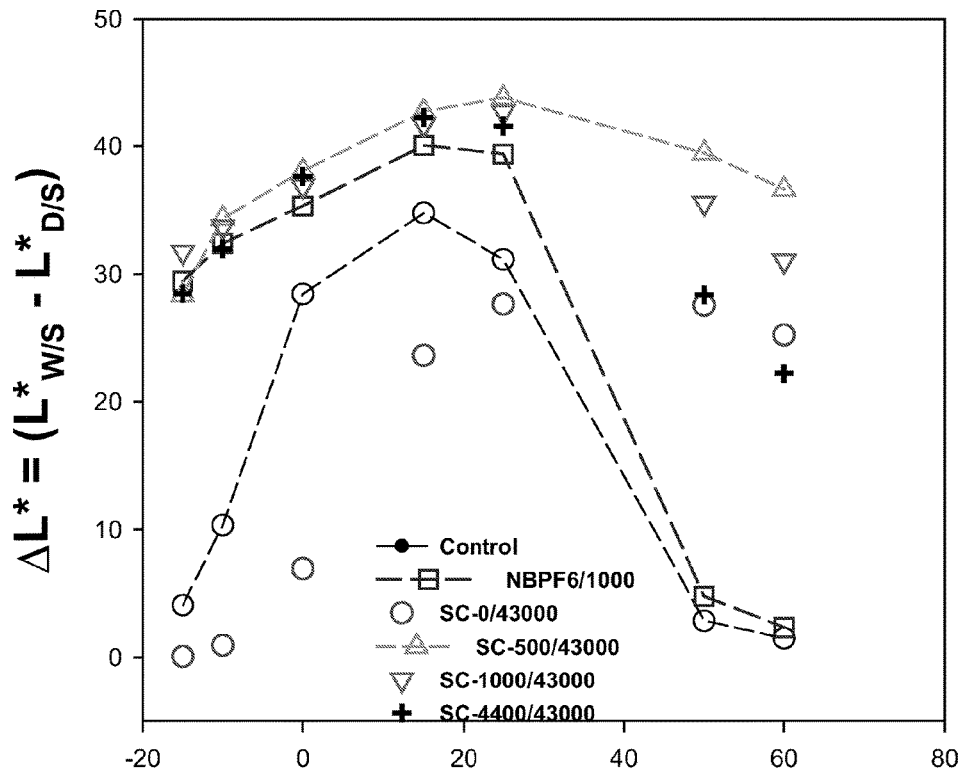

A further series of experiments were conducted to measure the electro-optic performance of the adhesive formulations. Experimental displays were prepared were prepared in the same way as before except that equilibration was effected at 25° C. and 70 percent relative humidity for several days; obviously, all displays used in this series of experiments contained the electrophoretic medium. The white and dark states of the displays were then measured at −15, −10, 0, 15, 25, 50 and 60° C., and the results are shown in FIG. 12 of the accompanying drawings. FIG. 13 shows the dynamic electro-optic range of the displays at the various temperatures.

From FIG. 12, it will be seen that the white state of the (undoped, uncross-linked) control display is greatly degraded at temperatures below about 0° C. and above about 50° C., with the dynamic range falling virtually to zero at these temperatures. Doping without cross-linking of the adhesive substantially improves the low temperature performance of the display, but has little effect on the high temperature performance above 50° C. The cross-linked but undoped adhesive (display SC-0/43000) shows improved high temperature performance but low temperature performance little different from the control. In contrast, all three of the doped, cross-linked adhesives showed good low and high temperature performance although the dynamic range at high temperatures decreases with increasing dopant concentration, with the adhesive containing only 500 ppm of the dopant giving the best overall performance. Thus, not only does the use of a doped, cross-linked adhesive given improved performance at both low and high temperatures, but the presence of the cross-linking agent reduces the amount of dopant needed for good low temperature performance.

Formation of Stylus-Writable Displays Using Polymerizable Liquid Materials

As discussed above, this aspect of the present invention relates to the use of substantially solvent-free polymerizable liquid materials (so-called "100% solids" monomers or oligomers) to form a protective layer over a layer of electro-optic material, this protective layer serving to prevent mechanical damage to the electro-optic material when a stylus or similar instrument is used to write on the display. It has been found that the use of substantially solvent-free polymerizable liquid materials to form such protective layers alleviates or eliminates the problems discussed above with regard to stylus-based displays; in particular, the use of these polymerizable liquid materials allows for the formation of thin but tough protective layers which provide adequate mechanical protection to commercial electro-optic materials but are sufficiently thin that the operating voltage of the display can be substantially reduced as compared with prior art stylus-based displays using conventional protective layers. In practice, it has been found that the operating voltage of displays of the present invention can be 80-90 percent lower than those of prior art displays. The thinner protective layers also allow higher resolution addressing of the display and enable the manufacture of stylus-based flexible displays.

The stylus-based displays of the present invention can be formed by coating or laminating a layer of an electro-optic material directly on to a conductive electrode. (In many cases, especially where the electrode needs to be light-transmissive, the electrode typically needs to be mechanically supported on a substrate, typically a polymeric film; however, such substrates will not be discussed in detail herein since appropriate substrates are well known to those skilled in the technology of electro-optic displays, and are discussed in, for example, the aforementioned U.S. Pat. No. 6,982,178.) The polymerizable liquid material may be used to form either the viewing or the non-viewing surface of the display, more commonly the former. Obviously, if the polymerizable liquid material is to form the viewing surface of the display, the polymeric layer formed by polymerization of the liquid material must be light-transmissive, and in this case the electrode on which the layer of electro-optic material is formed may be opaque and can be formed from an inexpensive conductor such as metallized poly(ethylene terephthalate) (PET) or an aluminum or other metal foil. However, if the electrode on which the layer of electro-optic material is formed will comprise the viewing surface of the display, this electrode needs to be light-transmissive, and may be formed for example of indium tin oxide (ITO), CNT, or a conductive polymer such as polythiophene.

The polymerizable liquid materials used in this process of the present invention are known in several industries as "hard coat materials" and are used, for example, as optical adhesives, to provide hard surfaces on wooden flooring, and as scratch resistant coatings on spectacles and other optical devices. The polymerizable liquid materials comprise a radiation or thermally curable monomer or oligomer, typically an acrylate, urethane acrylate blend or a silicone. The presently preferred liquid materials are optical adhesives manufactured by Norland Products, 2540 Route 130, Suite 100, P.O. Box 637, Cranbury N.J. 08512, especially those sold under the trade names NOA 63, NOA 71, and NOA 81. The polymerizable liquid materials are relatively low viscosity liquids which can flow to produce thin layers of liquid overlying the electro-optic material. Typically, the polymeric layer which is produced after polymerization of the liquid will have a thickness in the range of from about 6 to 250 μm, desirably in the range of from 8 to 50 μm.

One important property of the polymerizable liquid material is the conductivity of the layer formed after polymerization; the polymerized layer should not be too conductive or display resolution will be lost. Empirically, it has been found that loss of resolution seems to become significant in the range of surface conductivity $5 \times 10^5$ ohm/sq.

Figure 14:
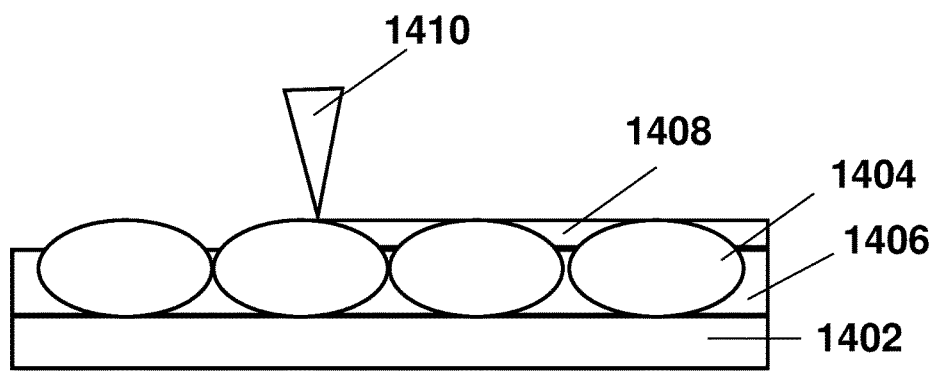
FIG. 14 is a schematic side elevation showing application of a polymerizable liquid material to an electro-optic material in a process for forming an electro-optic display of the present invention.

The thickness of the layer of polymerizable liquid material, and hence of the final polymeric layer can be controlled by several techniques which are familiar to those skilled in liquid coating. For example, FIG. 14 of the accompanying drawings illustrates, in a highly schematic manner, a conductive electrode 1402 on which has been deposited an electrophoretic layer comprising capsules 1404 disposed in a binder 1406. A polymerizable liquid material 1408 is being dispensed (for example, by means of a die or slot coater) over the electrophoretic layer, and the thickness of the liquid material 1408 is controlled by a doctor blade 1410. It should be noted that, since the capsules 1404 protrude upwardly from the binder 1406, the upper surface (as illustrated in FIG. 14) of the electrophoretic layer is non-planar, but that the provision of the liquid material 1408 enables the final surface of the polymeric protective layer to be planar. (Although FIG. 14 suggests that the thickness of the layer of polymerizable liquid material may approach zero over the centers of the capsules 1404, in practice this is undesirable and at least a minimal thickness of protective layer should be present over the entire electrophoretic layer.)

Figure 15:
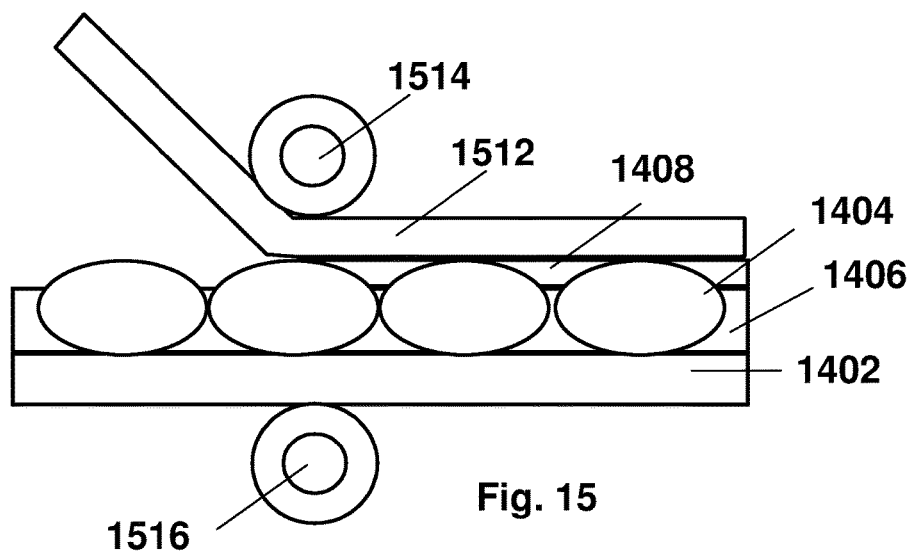
FIG. 15 is a schematic side elevation similar to FIG. 14 but showing the use of release sheet and a roller to form a uniform layer of the polymerizable liquid material.

FIG. 15 illustrates, in a highly schematic manner, an alternative process of the invention. The conductive electrode 1402, the capsules 1404 and the binder 1406 in this second process are identical to those shown in FIG. 14. Again a polymerizable liquid material 1408 is being dispensed over the electrophoretic layer. However, no doctor blade is employed; instead, a release sheet 1512 is applied over the liquid material 1408 and the entire assembly is passed between nip rollers 1514 and 1516 to control the thickness of the liquid material 1408.

Although FIG. 15 suggests that the assembly passes horizontally through the nip rollers, in large scale roll-to-roll production it may be more convenient for the assembly to travel vertically downwardly through the nip rollers, with the polymerizable liquid material being dispensed continuously between the electrophoretic medium and the release sheet 1512.

When a release sheet is employed to control the thickness of the liquid material 108, the release sheet may be removed immediately after curing of the liquid material, or it may be left in place until a later time to provide mechanical protection to the polymeric layer formed by curing the liquid material.

In the present process, it is not essential that the sheet used to control the thickness of the liquid layer be a release sheet, nor is it necessary that this sheet be flexible. Furthermore, it is not essential that the sheet be removed from the polymeric layer formed by curing the liquid material. For example, the sheet, whether rigid or flexible, could comprise a transparent sheet which acts as a protective layer in the final display. Alternatively, the sheet could comprise an electrically-conductive layer, which can remain permanently attached to the final display by the polymer layer. Typically, such an electrically-conductive layer will form the common front electrode of the final display, and in such a case, the electrically-conductive layer should be light-transmissive so that the change in optical state of the electro-optic medium can be seen through the electrically-conductive layer.

The sheet used to control the thickness of the liquid layer can also have the form of a color filter array (typically with an electrically-conductive layer to form the common front electrode of the final display), which can be flexible or rigid. Such a color filter array needs to be aligned with the pixels of the electrode on the opposed side of the electro-optic medium. If the color filter array is rigid (for example, a glass color filter array), the color filter array may be placed on the polymerizable liquid material and coarsely aligned with the pixels. The color filter array may then be pressed or rolled, and one portion of the color filter array finely aligned with the pixels using a color filter array alignment tool or fixture. Following the fine alignment, a small area of the polymerizable liquid material is spot cured to fix the color filter array in position relative to the other components of the display. The display may be treated to remove any trapped gas (see below) before the remaining parts of the polymerizable liquid material are cured.

A flexible color filter array may be attached in a very similar manner except that to avoid misalignments due to distortion of the flexible color filter array, the steps of fine alignment of the color filter array and subsequent spot curing will typically need to be repeated multiple times on different areas of the display until all areas of the display are properly finely aligned.

In most cases where the sheet used to control the thickness of the liquid layer is to remain as a permanent part of the display, it is difficult to avoid trapping some air bubbles underneath the sheet. Techniques for removing such trapped air bubbles are known in the art (for example autoclaving the display, or placing the display under vacuum) and any of the known techniques may be used in the present process. As noted above, if the sheet is a color filter array or similar sheet which needs to be aligned with the remaining parts of the display, spot curing of the polymerizable liquid material should be effected before the bubble removal process in order to ensure that the alignment of the sheet is preserved during bubble removal. In other cases, for example when the sheet simply comprises an electrically-conductive layer and (optionally) a support for the electrically-conductive layer, no fine alignment is required, and bubble removal can be carried out without previous spot curing of the polymerizable liquid material.

The following Example is now given, though by way of illustration only, to show details of a presently preferred process of the invention.

EXAMPLE 7

A capsule/binder slurry was slot coated on to the ITO-covered surface of a poly(ethylene terephthalate)/ITO film substantially as described in the aforementioned U.S. Pat. No. 6,982,178, and the resultant coated film dried to produce a coherent layer of capsules in binder on the PET/ITO film. Separately, a thin metal sheet approximately 24 inches (61 cm) square was covered with a plastic release sheet, arranged to that the release layer was exposed. A 12 inch (30 cm) square of the dried capsule-coated film was placed centrally on top of the release sheet, with the capsule layer exposed. A bead of Norland optical adhesive (NOA 63, NOA 71, or NOA 81) was placed 13 mm from one edge of the capsule-coated film, this bead extending to within about 13 mm of each side edge of the film to minimize the amount of the optical adhesive squeezing from the display during later steps of the process. A second release sheet was then placed over the capsule-coated film bearing the optical adhesive, the second release sheet being placed with its release layer facing the capsule-coated film, and being of a size such that it extended at least 2 inches (51 mm) beyond the edge of the capsule-coated film all around the periphery of the film to minimize contamination of laminator rollers during the subsequent lamination.

The entire stack of metal plate, capsule-coated film and two release sheets was then positioned in a roll laminator with the rolls open, the stack being positioned such that the rolls would close on the release sheet clear of the capsule-coated film. The stack was then passed through the roll laminator at room temperature and 50 psig (about 0.48 MPa) at a speed of 0.5 ft/min (about 2.5 mm/sec) using 6 inch (152 mm) rollers medium durometer silicone rollers. This pass through the laminator caused the optical adhesive to spread out in a thin layer over the who of the capsule-coated film, in the process planarizing the original rough surface of the film. The stack was then passed twice at a speed of 20 feet/min (about 100 cm/sec) under a 150 W/inch (6 W/mm) ultraviolet lamp to partially cure the optical adhesive. The top release sheet was then removed, and the remaining layers passed twice under the same conditions beneath the ultraviolet lamp to complete the curing of the optical adhesive. Thereafter, the complete PET/ITO/capsule-binder layer/optical adhesive display can be removed from the metal plate and adjacent release sheet and cut to the size needed. It will be appreciated that the process as described in this Example is a small-scale laboratory method and that other techniques, especially roll-to-roll techniques may be more appropriate for mass production.

The use of polymerizable liquid materials which can be cured to a hard, tough finish, in accordance with preferred embodiments of the present invention, allows for the use of a very thin, non-conductive protective layer having a smooth finish and giving good mechanical protection to an electro-optic layer. Radiation curing allows for fast line speeds and economical roll-to-roll production methods.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

The invention claimed is:

1. An electro-optic display capable of being imaged by a stylus, the display comprising:
  an electrode;
  a layer of an electro-optic material containing encapsulated electrophoretic media disposed on the electrode, such that the surface of the layer of electro-optic material remote from the electrode is non-planar, the encapsulation of the electrophoretic media being selected from the group consisting of a plurality of microcells sealed with a sealing layer and a plurality of discrete droplets surrounded by a continuous phase comprising a polymeric material; and
  a polymeric layer overlying the layer of electro-optic material,
  the polymeric layer comprising the polymerization product of a substantially solvent-free polymerizable liquid material, the surface of the polymeric layer remote from the layer of electro-optic material being substantially planar and forming an exposed external surface of the display on which a stylus can be placed.

2. An electro-optic display according to claim 1 wherein the thickness of the polymeric layer is from about 6 to about 250 μm.

3. An electro-optic display according to claim 2 wherein the thickness of the polymeric layer is from about 8 to about 50 μm.

4. An electro-optic display according to claim 1 wherein the polymeric layer comprises an acrylate or a urethane acrylate blend or a silicone.

5. An electro-optic display according to claim 1 wherein the electrophoretic media comprises a plurality of electrically charged particles disposed in a fluid and capable of moving through the fluid under the influence of an electric field.

6. An electro-optic display according to claim 5 wherein the fluid is gaseous.

7. A process for the preparation of an electro-optic display, the process comprising:
  forming a layer of an electro-optic material containing encapsulated electrophoretic media on an electrode, the surface of the layer of electro-optic material remote from the electrode being non-planar, the encapsulation of the electrophoretic media being selected from the group consisting of a plurality of microcells sealed with a sealing layer, a plurality of capsules, and a plurality of discrete droplets surrounded by a continuous phase comprising a polymeric material;
  depositing a layer of a substantially solvent-free polymerizable liquid material over the layer of electro-optic material; and
  exposing the polymerizable liquid material to conditions effective to cause polymerization of the material, thereby forming a polymeric layer overlying the layer of electro-optic material, the surface of the polymeric layer remote from the layer of electro-optic material being substantially planar and forming an exposed external surface of the display.

8. A process according to claim 7 wherein the thickness of the polymeric layer is from about 6 to about 250 μm.

9. A process according to claim 7 wherein the thickness of the polymeric layer is from about 8 to about 50 μm.

10. A process according to claim 7 wherein the polymeric layer comprises an acrylate or a urethane acrylate blend or a silicone.

11. A process according to claim 7 wherein the electrophoretic media comprises a plurality of electrically charged particles disposed in a fluid and capable of moving through the fluid under the influence of an electric field.

12. A process according to claim 11 wherein the fluid is gaseous.

* * * * *